(12) United States Patent
Kaburlasos

(10) Patent No.: US 7,478,214 B2
(45) Date of Patent: Jan. 13, 2009

(54) CLOCK-GATED RANDOM ACCESS MEMORY

(75) Inventor: Nikos Kaburlasos, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/325,887

(22) Filed: Jan. 4, 2006

(65) Prior Publication Data

US 2007/0156995 A1    Jul. 5, 2007

(51) Int. Cl.
*G06F 13/00*   (2006.01)
*G06F 12/00*   (2006.01)

(52) U.S. Cl. .................. 711/167; 711/100; 711/104; 711/154

(58) Field of Classification Search ................. 711/154, 711/149, 170, 100, 104, 179; 375/354
See application file for complete search history.

(56) References Cited

U.S. PATENT DOCUMENTS 6,898,678 B1 * 5/2005 Six et al. ..................... 711/151
6,999,542 B1 * 2/2006 Korger et al. ............... 375/354

* cited by examiner

*Primary Examiner*—Tuan V. Thai
(74) *Attorney, Agent, or Firm*—Blakely, Sokoloff, Taylor & Zafman LLP

(57) ABSTRACT

A method and apparatus for gating a clock signal to one or more embedded blocks of a random access memory (RAM), is described. In one embodiment, a clock gating block is coupled to a RAM EBB, the clock-gating block to provide a RAM clock when receiving read and write enable signals and to provide a gated clock signal when the RAM EBB is idle. In another embodiment, a clock gating block is coupled to a RAM bank, having a plurality of RAM EBBs, the clock-gating block to provide a RAM clock to the RAM bank when receiving read and write enable signals and to provide a gated clock signal to the RAM bank when the RAM bank is idle.

24 Claims, 17 Drawing Sheets

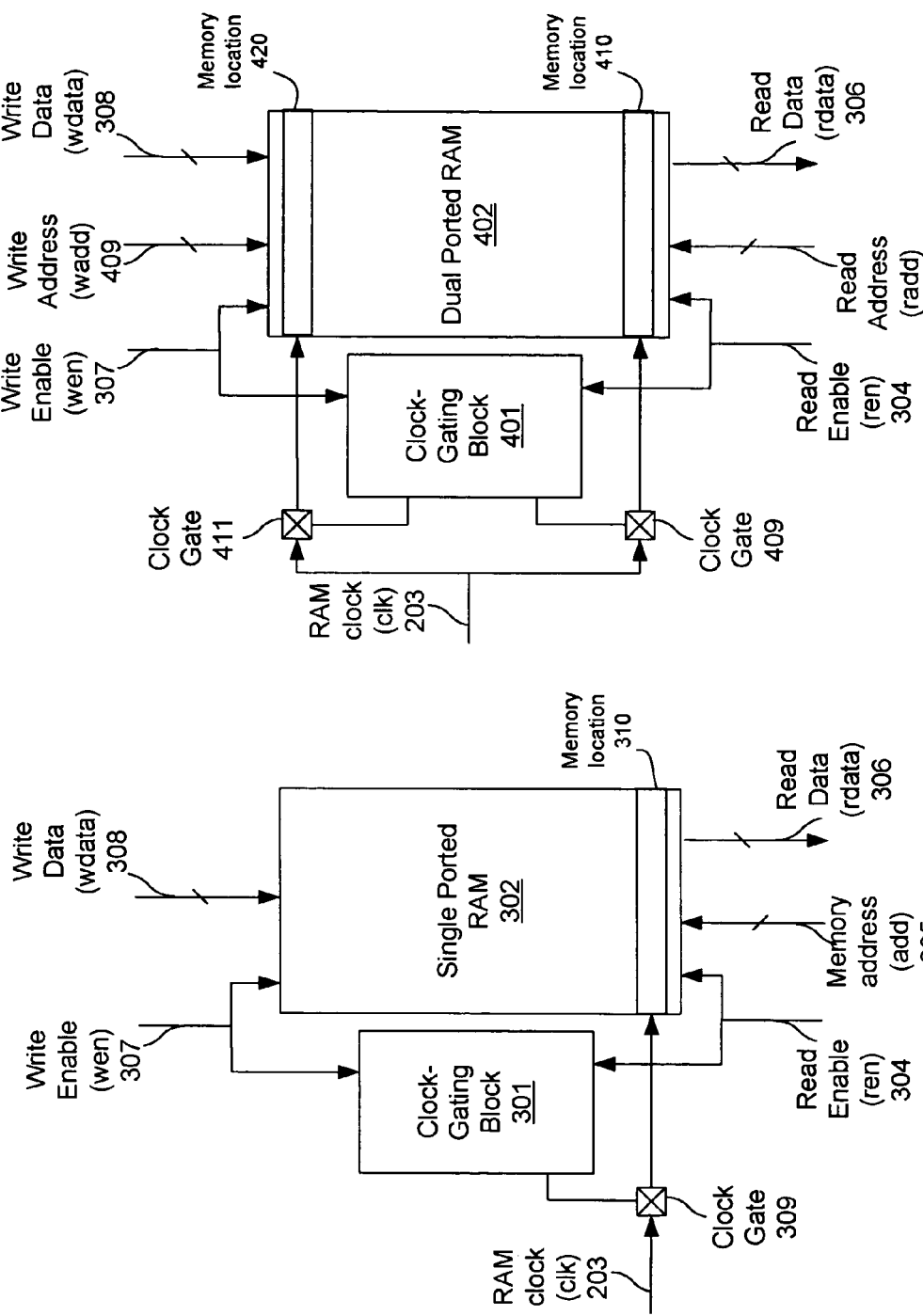
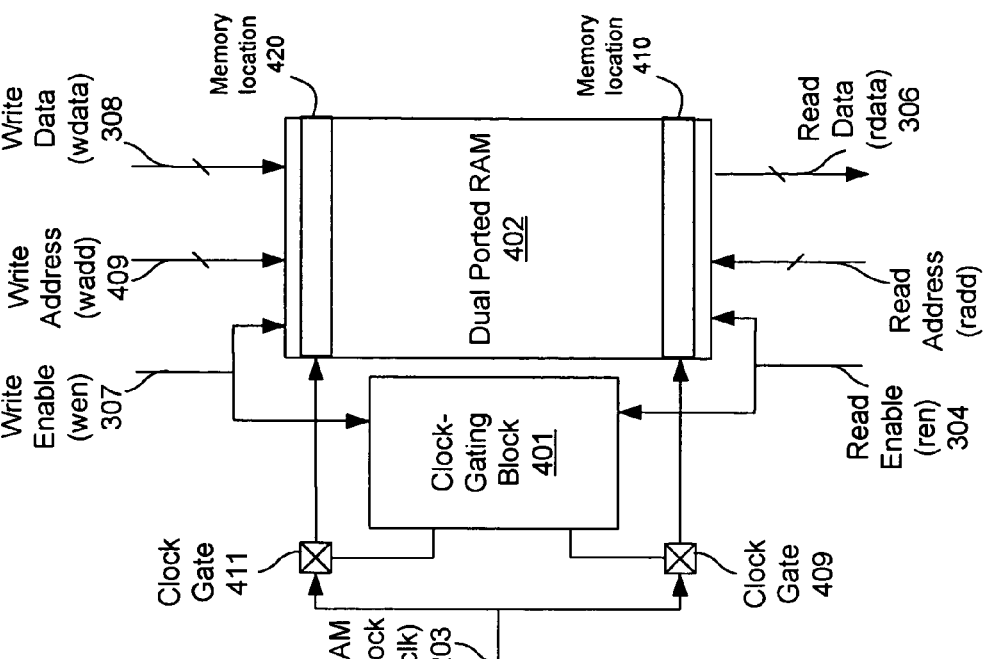
FIG. 4
FIG. 3

CLOCK-GATED RANDOM ACCESS MEMORY

TECHNICAL FIELD

The present invention relates generally to the field of memory devices and, more specifically, to random access memory.

BACKGROUND

Current chip designs include large amounts of random access memory (RAM) and the trend is for increasing requirements for on-chip RAM (in the order of hundreds of kilobytes). Like any other logic, RAMs consume power, consisting of sense amp power, output driver power, clock power etc. When a RAM is not accessed for a read or write access operation, the RAM sense amps and drivers are typically turned off, but the RAM clock continues to toggle, leading to a certain amount of idle power dissipation.

Large logical RAMs are usually architected as an array of smaller RAM EBBs (Embedded Blocks), as shown in FIG. 1. FIG. 1 illustrates a conventional 256×1024 RAM having four banks of four EBBs 64×256 bits. RAM compilers typically have limitations that prevent the generation of a single large RAM EBB, so designers often resort to generating a number of smaller RAM EBBs, such as RAM EBBs 101(1)-101(16), which are organized as a single logical RAM 100. The RAM 100 is a 256×1024 bits RAM, organized as a group of sixteen 64×256 RAMs 101(1)-101(16). The logical RAM 100 is organized in four banks, bank1 102(1) thru bank4 102(4), 256×256 bits each. When a RAM bank, for example bank1 102(1), is accessed for a read or write access operation, all four RAM banks 102(1)-102(4) receive a toggling RAM clock 103, even though the other three banks are not being accessed for read or write operations.

In the case of a single-ported RAM, only one RAM bank, at most, can be accessed at a time; the remaining banks are idle. In the case of a dual-ported RAM, only two RAM banks, at most, are accessed at a time and the remaining banks are idle. However, the idle RAM banks (or RAM EBBs), which are not accessed, still dissipate power, since the RAM clock 103 applied to these idle RAM banks/EBBs is still toggling.

BRIEF DESCRIPTION OF THE DRAWINGS

The present invention is illustrated by way of example and not limitation in the figures of the accompanying drawings, in which like references indicate similar elements and in which:

FIG. 3 illustrates a block diagram of one exemplary embodiment of a single-ported RAM coupled to a clock-gating block.

FIG. 4 illustrates a block diagram of one exemplary embodiment of a dual-ported RAM coupled to a clock-gating block.

DETAILED DESCRIPTION

Figure 1:
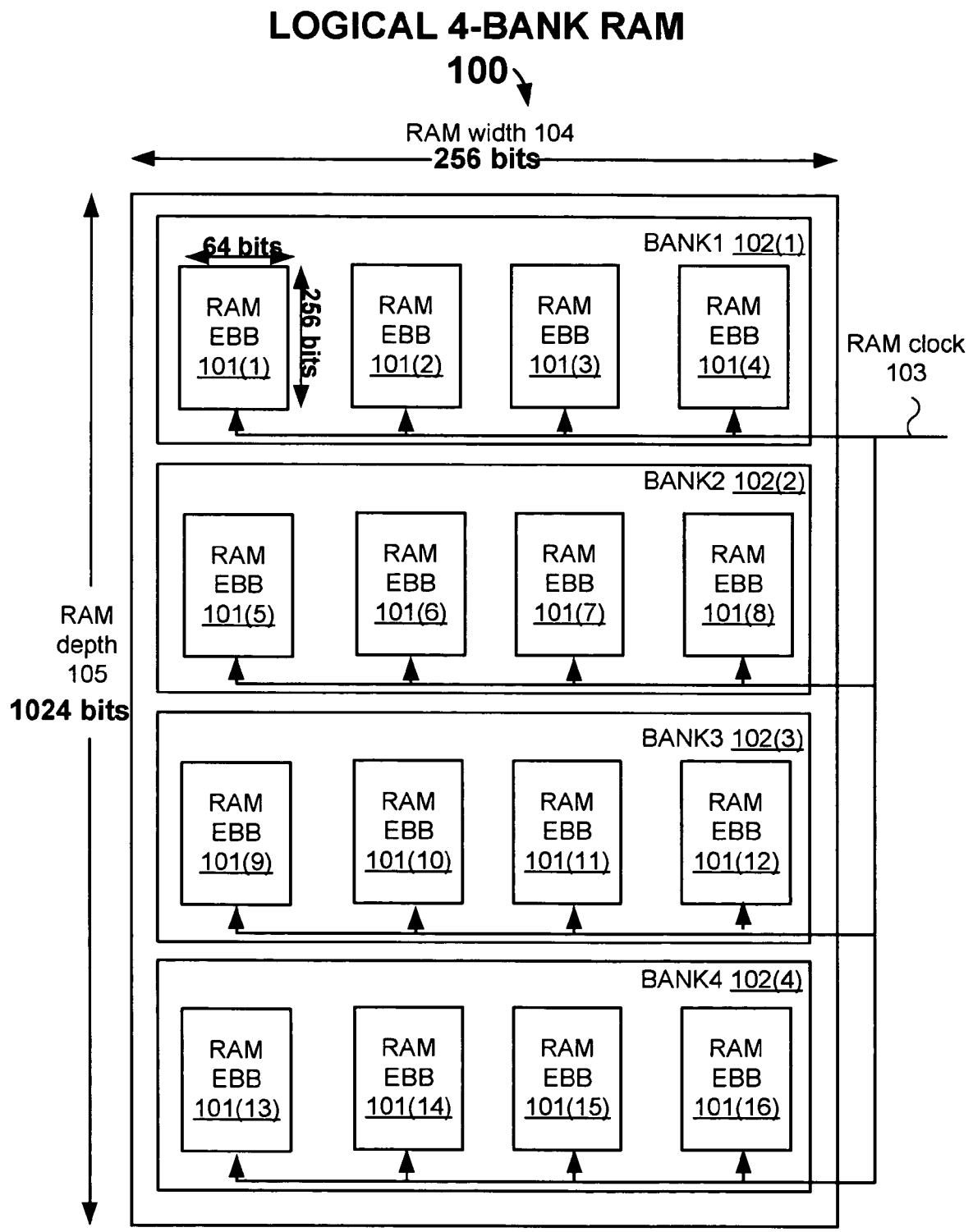
FIG. 1 illustrates a conventional 256×1024 RAM having four banks of four RAM EBBs 64×256 bits.

A method and apparatus for gating a clock signal to one or more embedded blocks of a random access memory (RAM), is described. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of the present invention include various operations, which will be described below. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Previously, RAMs have not been gated on an EBB basis, meaning if one RAM EBB of the RAM was accessed, the clock to the entire logical RAM remained toggling, which consequently consumes power. The method and apparatus described herein increase the granularity of RAM clock gating so that it may apply to every RAM EBB in the logical RAM that is idle. Alternatively, the RAM clock gating may be applied to every RAM bank in the logical RAM that is idle. In one embodiment, the RAM clock gating may be applied to every clock cycle in which the RAM EBB is idle, and may be applied to every RAM EBB. By clock-gating at the RAM EBB or RAM bank levels, idle power savings may be optimized, creating a lower power RAM than a RAM that does not implement clock-gating at the RAM EBB and RAM bank levels. Low power logic, including logical RAM, may be used in various applications, such as mobile applications, such as wireless devices known by those of ordinary skill in the art.

The method and apparatus describe herein may also be transparent to the designers who use the logical ram in their functional unit and may not require modification of pre-existing designs in order to support the RAM clock gating feature, except for providing a bypass enable signal to enable/disable the RAM clock gating feature within the design.

The proposed RAM clock gating method and apparatus may lead to measurable savings of RAM power and allow designers to meet limited power budgets for low power designs.

It should be noted that conventionally, functional units within integrated circuits may use a clock-gating scheme to gate (e.g., turn off) the clock provided to the functional unit in order to conserve power. Similarly, a clock-gating scheme may be implemented to gate the clock provided to the entire logical RAM. However, if any logic continued to operate within the functional unit, the clock provided to the functional unit may not be gated, resulting in power conservation only when the functional unit is not performing any operation. Similarly, if logic within the functional block were accessing only a portion of the logical RAM, the clock provided to the logical RAM may not be gated, resulting in power conservation only when the entire logical RAM is not being accessed. As previously mentioned, current chip designs include large amounts of RAM and the trend is for increasing requirements for on-chip RAM (in the order of hundreds of kilobytes). Since a large amount of the chip may include RAM, minimal power may be conserved by gating the global clock signal provided to the logical RAM. For example, the area of one functional unit may include ⅓ of its logical core as logical RAM.

The method and apparatus describe herein applies clock gating at the RAM EBB and RAM bank level in order to conserver more power than conventional designs that may have only employed clock gating at the functional unit level and/or at the entire logical RAM level. In one embodiment, the gating of the RAM clock provided to each RAM EBB may be performed on every clock cycle in which the RAM EBB is idle. In one exemplary embodiment, the RAM clock of a single-ported RAM may be gated on every clock cycle except for the first clock cycle after a write access, as described in more detail below. The RAM EBB is idle when no read or write access operation is being performed on an address location containing the RAM EBB. By gating the RAM clock provided to each idle RAM EBB, the power consumed by the logical RAM may decrease.

In one exemplary embodiment, three OR gates and a clock gate can be added on the clock path to ensure that the RAM clock is gated whenever a read or write access operation is not performed, as shown in the following figures. The clock gate may be a standard clock gate, which ensures that when its enable input de-asserts, its gated-clock output (gclk) is gated on the following clock cycle (e.g., first or second clock cycle after the enable input de-asserts). In addition, when the clock-gating enable input asserts, the clock is ungated on the following cycle. For example, the gated clock may be gated on the next clock cycle in a dual-ported RAM, having read and write accesses occur on the rising edge of the RAM clock. In another exemplary embodiment, the gated clock may be gated on a subsequent clock cycle (e.g., one clock cycle after the read enable de-asserts or two clock cycles after the write enable signal de-asserts) in a single-ported RAM, having read accesses occur on the rising edge and write accesses occur on the falling edge of the RAM clock. In this embodiment, the gated clock may be delayed when the RAM write enable de-asserts because of an additional clock delay introduced by having the write accesses occur on the falling edge of the RAM clock, instead of on the rising edge of the clock cycle. More specifically, the logic that drives data in to the RAM typically generates the write address and write enable signals on the rising edge of the clock, whereas the RAM samples them on the falling edge. This creates a half-cycle path that is at risk of being a long, timing-critical path. Sampling the write address and write enable signals before they enter the RAM EBB helps ensure that these paths will not be timing critical, but also inserts a one-clock delay on these paths.

In one embodiment, the clock-gating enable signal includes logic for performing an OR operation on the following signals: the RAM EBB read enable, the RAM EBB write enable, a delayed (flopped) version of the RAM EBB write enable. In one embodiment, the delayed or flopped version of the write-enable signal may be needed in a single-ported RAM which performs writes on the falling edge of the clock. External logic drives the write-enable on the rising edge of the clock. The RAM wrapper samples this write-enable and then drives it to the RAM EBB on the next rising edge of the clock. The RAM EBB samples the write-enable on the following falling edge of the clock. The extra delay-flop may be added in the RAM wrapper to make sure there is no timing-critical paths, as previously described.

In another embodiment, a bypass enable signal may also be in the equation to perform an OR operation to generate the clock-gating enable signal. The bypass enable signal may be used to control (enable/disable) the RAM clock gating feature and measure the power savings achieved by it.

Figure 2:
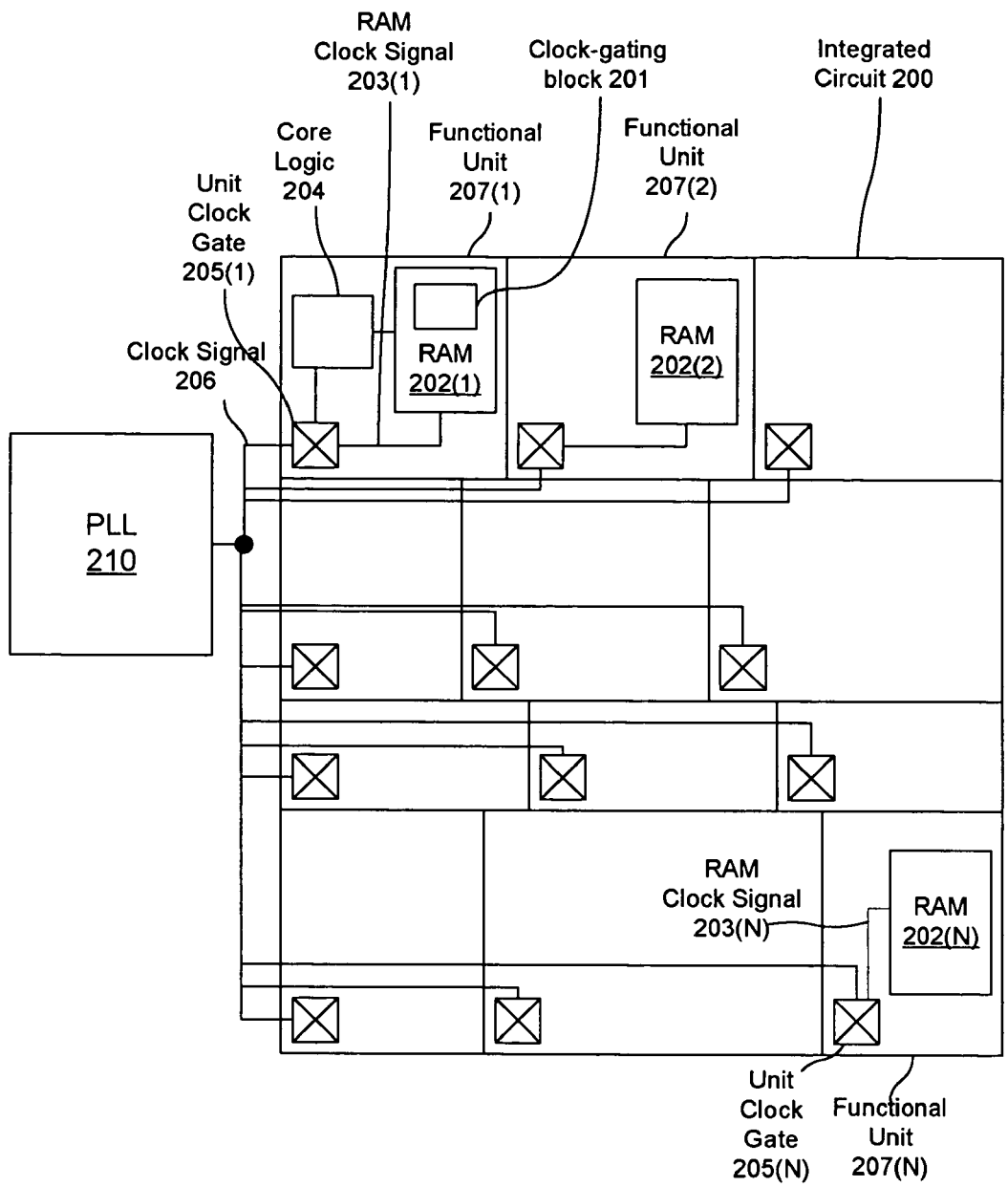
FIG. 2 illustrates a block diagram of one embodiment of an integrated circuit having a plurality of functional units including RAM and a clock-gating block.

FIG. 2 illustrates a block diagram of one embodiment of an integrated circuit having a plurality of functional units including RAM and a clock-gating block. Integrated circuit 200 is coupled to phase-locked loop (PLL) 210. PLL 210 provides clock signal 206 to a plurality of functional units 207(1)-207(N) of the integrated circuit 200. Each functional unit may include a core logic 204, such as sequential or combinational logic. The core logic 204 of functional units 207(1)-207(N) may be coupled to logical RAM, such as RAM 202(1)-202(N). As previously mentioned, functional units 207(1)-207(N) may also include unit clock gates 205(1)-205(N) to gate the clock signal 206 to the corresponding functional blocks 207(1)-207(N). In this embodiment, functional blocks 207(1)-207(N) include one or more clock-gating blocks (e.g., clock-gating block 201) couples to one or more RAM EBBs of RAMs 202(1)-202(N). Clock-gating block 201 gates the RAM clock signals 203(1) received by the RAM 202, and provides a gated clock signal to one or more RAM EBBs of the RAM 202 when the one or more RAM EBBs are idle (e.g., no write or read access). In one exemplary embodiment, RAM 202 may be ⅓ the logic core area of functional unit 207. Alternatively, RAM 202 may be smaller or larger than ⅓ the area of functional unit 207.

In one embodiment, integrated circuit 200 may be a memory. Alternatively, integrated circuit may be a processor, memory controller, or other components of an electronic system as described below.

FIG. 3 illustrates a block diagram of one exemplary embodiment of a single-ported RAM coupled to a clock-gating block. Single-ported RAM 302 is coupled to clock-gating block 301. Single-ported RAM 302 receives as inputs write enable 307 (e.g., wen), read enable 304 (e.g., ren), memory address 305 (e.g., addr), and write data 308 (e.g., wdata) from the core logic 204 within the functional unit 207. Single-ported RAM 302 provides, as output, read data 306 (e.g., rdata). When a read access operation is being performed from memory location 310, the single-ported RAM 302 receives read enable 304 and corresponding memory address 305, and outputs the data stored at memory location 310 as read data 306. When a write access operation is being performed in memory location 310, the single-ported RAM 302 receives write enable 307 and corresponding memory address 305, and inputs write data 308 to be stored at memory location 310. Alternatively, read and write access operations may be performed at other memory locations within the single-ported RAM 302.

Clock-gating block 301 is coupled to a clock gate 309. Clock-gating block 301 and clock gate 309 gate the RAM clock signal 203 received by the single-ported RAM 302, and provides a gated clock signal to memory location 310 when the memory location is idle (e.g., no write or read access in the memory location). Clock-gating block 301 receives, as inputs, write enable 307 (e.g., wen) and read enable 304 (e.g., ren) from the core logic 204 within the functional unit 207. Write enable 307 and read enable 304 may be used to determine when to gate the RAM clock 203 to be provided to memory locations within the single-ported RAM 302, which are idle (e.g., no write or read access in the memory location).

Memory location 310, in one embodiment, is one RAM EBB. Alternatively, memory location 310 may include a plurality of RAM EBBs, such as one RAM bank or a plurality of RAM banks having one or more RAM EBBs.

In one exemplary embodiment of a single-ported RAM implementation, read accesses may be performed on the rising edge of the clock signal and write accesses on the falling edge of the clock signal. This may be done to not impact performance. For example, if both read and write accesses happened on the rising edge of the clock signal, only a read or write access could be performed on each clock cycle. This may lower performance of single-ported RAMs as compared to dual-ported RAMs, which may be configured to do a read and write access on the same rising edge of the same clock signal. In another embodiment, by enabling single-ported RAMs to perform writes on the falling edge of the clock signal and perform reads on the rising edge of the, clock signal, allowing both read and write access operations to be performed on the same clock cycle.

As previously mentioned, in a single-ported RAM implementation, read accesses may occur on a rising edge of the RAM clock 203 and write access on the falling edge of the RAM clock 203. In the case of read accesses to the RAM EBB (e.g., RAM EBB 502), if read enable 304 de-asserts in clocks cycles #1, 2, ..., N, then the RAM clock 203 is gated in clock cycles #2, 3, ..., N+1. This occurs because if the logic that drives the RAM clock 203 de-asserts the RAM read enable 304 on the rise of clock cycle #1, the RAM wrapper (and the RAM EBB, inside the wrapper) samples the read enable 304 on the rise of clock cycle #2, which gates the RAM clock 203 on clock cycle #2. In the case of write accesses to the RAM EBB, if write enable 307 de-asserts in clock cycles #1, 2, ..., N, the RAM clock 203 is gated (e.g., gated clock 504 de-asserted) in clock cycles # 3, 4, ..., N+1. This occurs because in single-ported RAM EBBs, write accesses happen on the fall of the RAM clock 203. So, if the logic that drives the RAM clock de-asserts the RAM write enable 307 on the rise of clock cycle #1, the RAM wrapper (and the RAM EBB, inside the wrapper) samples write enable 307 on the rise of clock cycle #2, the RAM EBB samples write enable 307 on the fall of clock cycle #2 and gates RAM clock 203 in clock cycle #3.

Figure 12A:
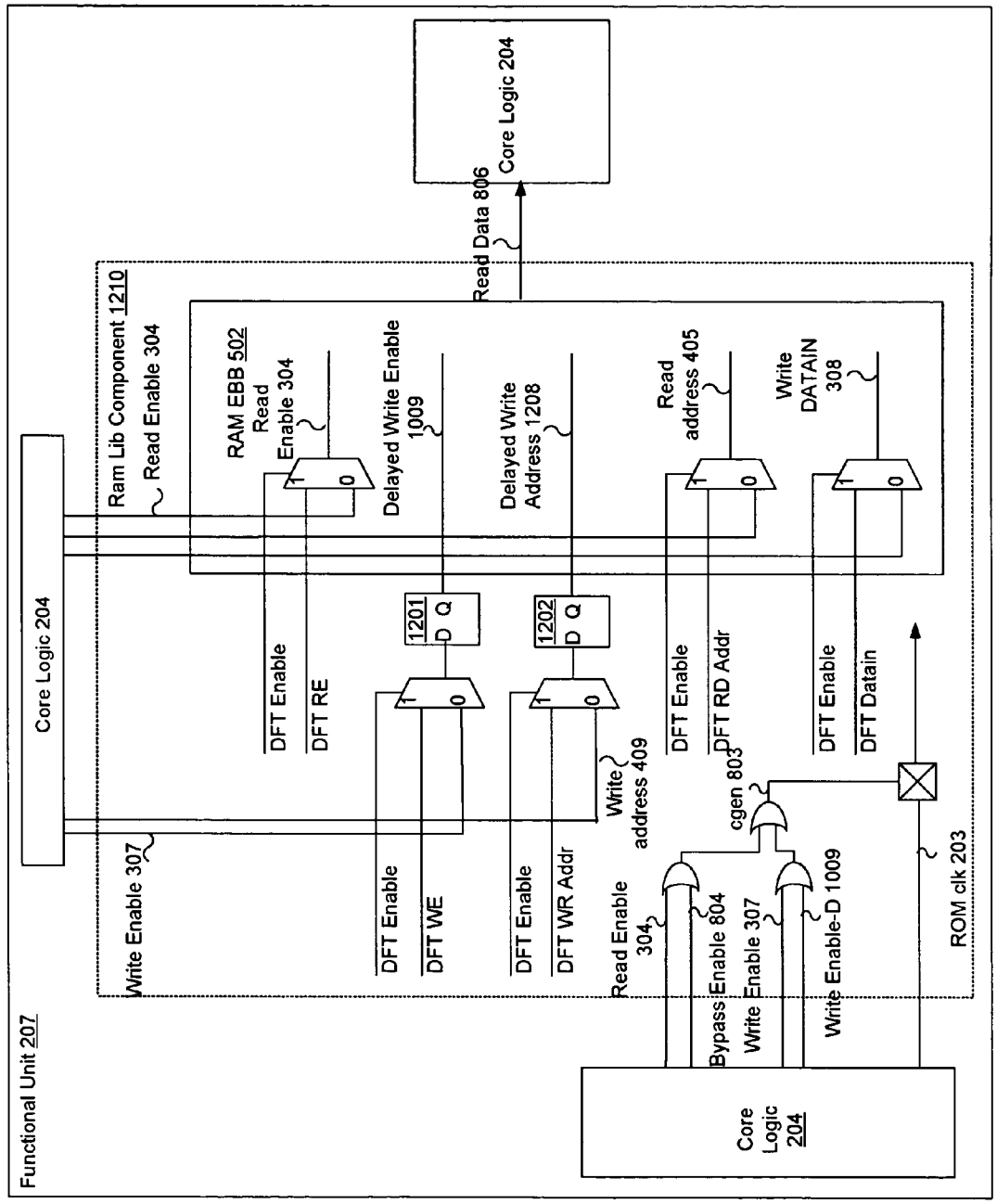
FIG. 12A illustrates one exemplary embodiment of a single-ported RAM EBB coupled to a clock-gating block.

Single-ported RAMs have one port for read and write operations. Accordingly, single-ported RAMs have a single address bus and a single clock, RAM clock 203, for the read and write operations. A simple single-ported RAM implementation would perform a read or a write access operation on the rise of RAM clock 203. Because there is a single RAM clock and address bus, read and write accesses may not be performed in the same clock cycle. This design may hurt performance in comparison to dual-ported RAMs, which may perform read and write accesses on the same clock cycle. Alternatively, single-ported RAMS, generally, perform read operations on the rising edge of the RAM clock 203, and a write operation on the falling edge of the RAM clock 203, in order to perform both read and write accesses in the same clock cycle, like dual-ported RAMs, as long as it is not performed on the same RAM location. The RAM address bus carries the read address on the rising edge of the clock and the write address on the falling edge of the clock. This scheme may increase the complexity of the RAM design, but enables the single-ported RAM to perform both read and write operations in a single clock cycle. A single-ported RAM with surrounding RAM wrapper is illustrated in FIG. 12A. Single-ported RAMs may be used in order to reduce the number of RAM IO pins. Single-ported RAMs may have other advantages known by those of ordinary skill in the art.

Figure 12B:
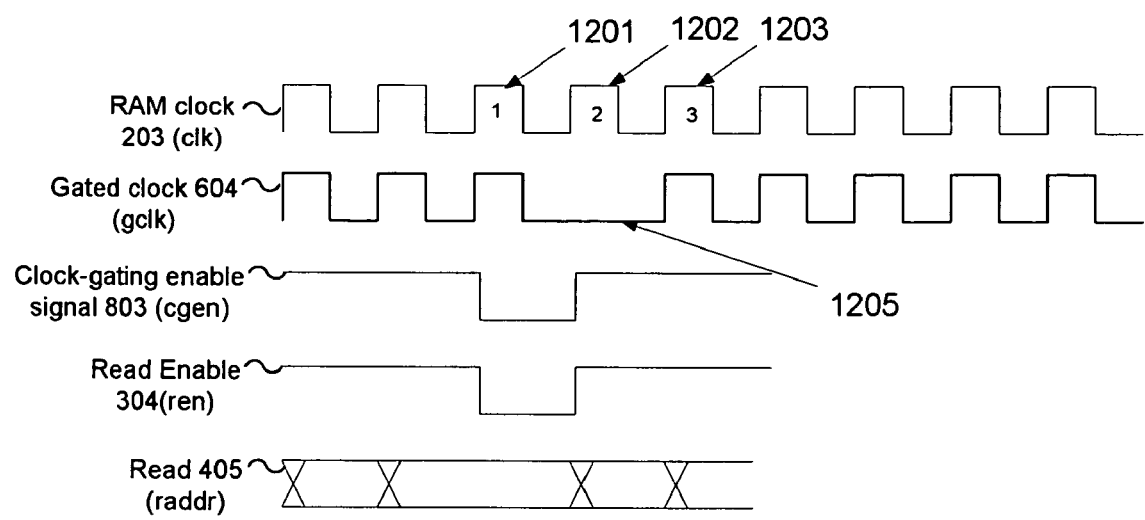
FIG. 12B illustrates a timing diagram of one embodiment of a read access operation of the single-ported RAM EBB coupled to the clock-gating block of FIG. 12A.
Figure 12C:
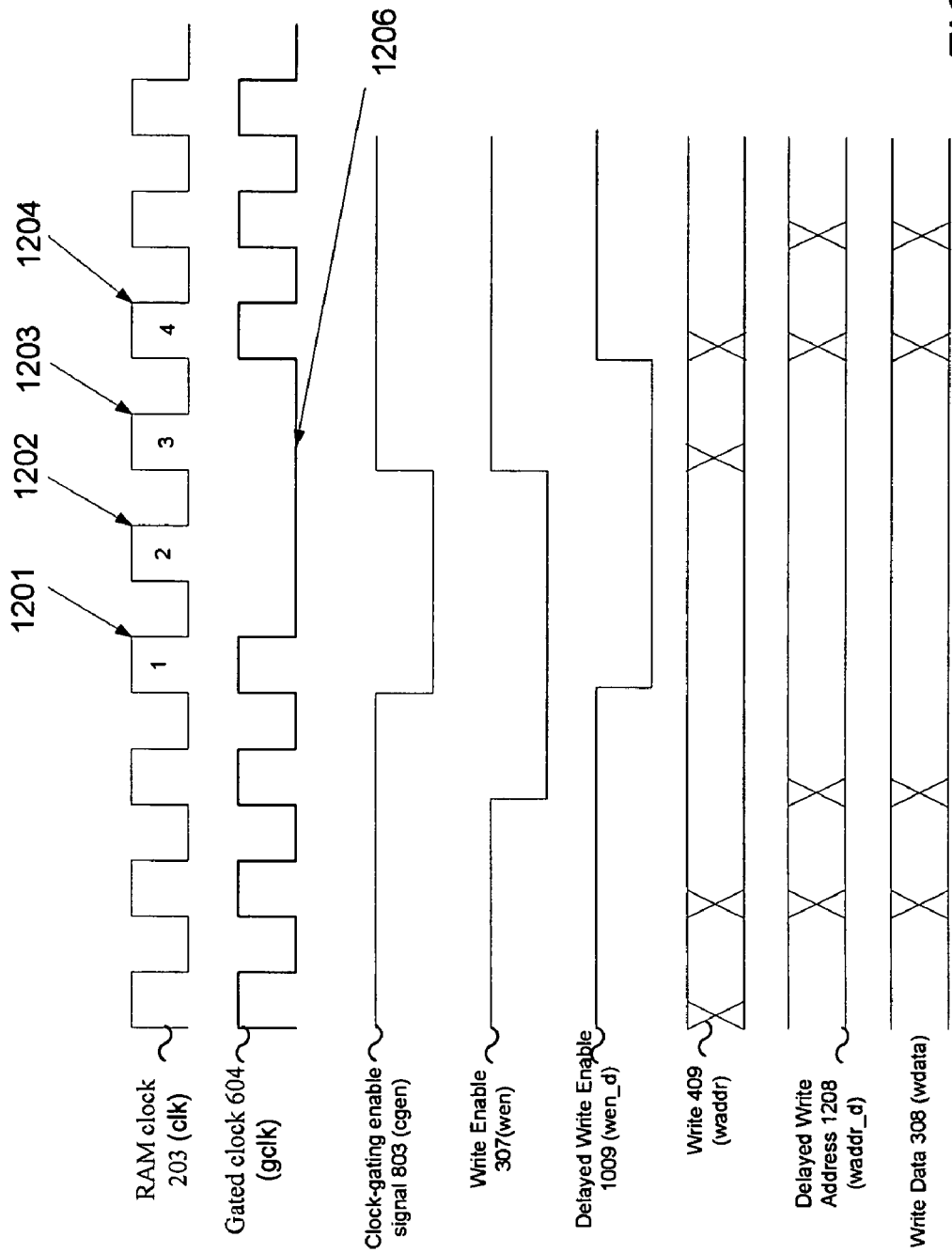
FIG. 12C illustrates a timing diagram of one embodiment of a write access operation of the single-ported RAM EBB coupled to the clock-gating block of FIG. 12A.

In one embodiment, clock gating may be performed on a RAM EBB, having a single-ported architecture. The RAM clock is gated via the read enable 304 and write enable 307, as illustrated in FIG. 12A. The timing of the read and write access are illustrated in FIGS. 12B and 12C. If the read (or write) enable de-asserts on a certain clock, then the RAM clock is gated on the following clock cycle for a read operation and a subsequent clock cycle (e.g., two clock cycles) for a write operation.

Figure 11A:
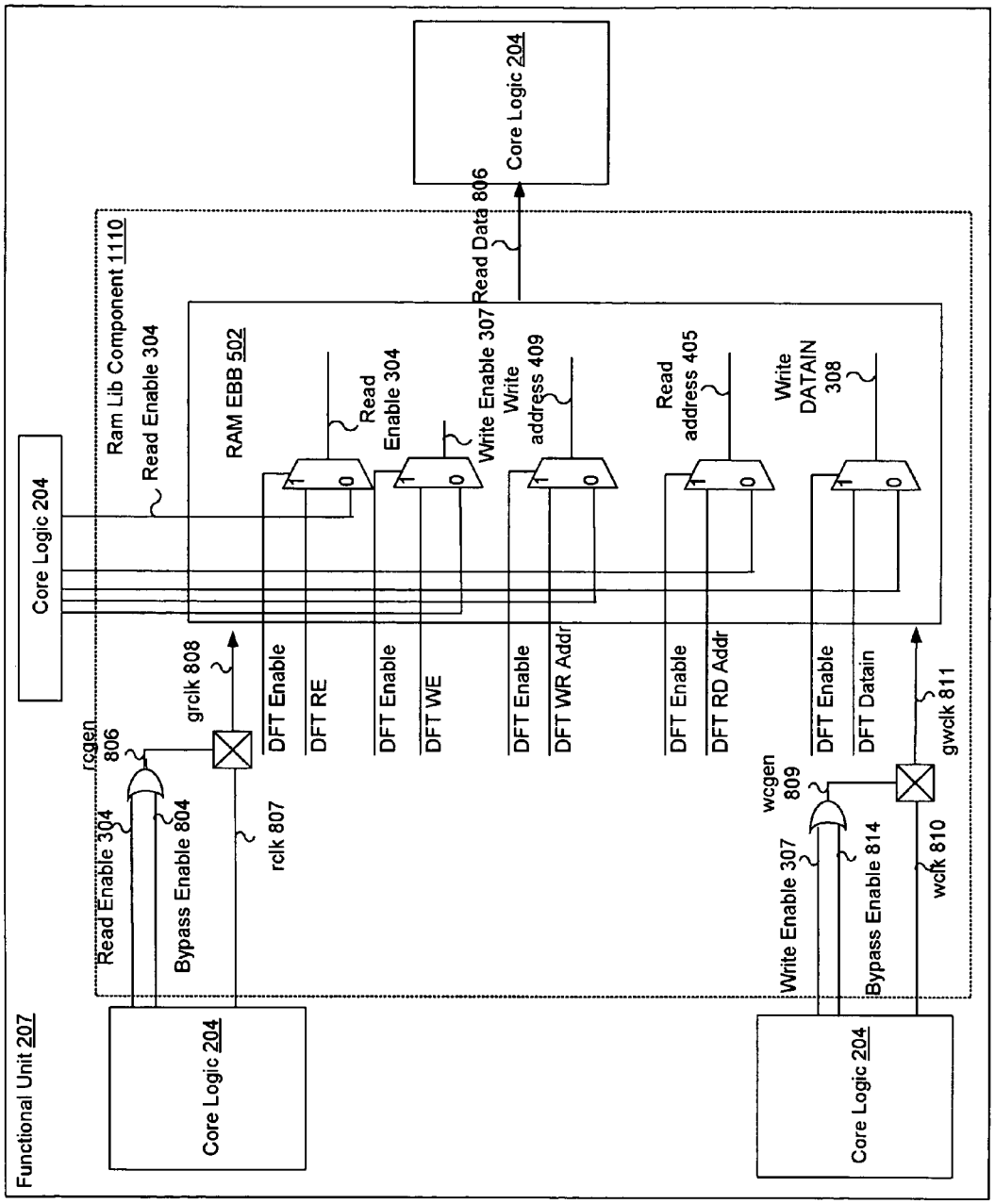
FIG. 11A illustrates one exemplary embodiment of a dual-ported RAM EBB coupled to a clock-gating block.

Dual-ported RAMs have a separate read port and a separate write port. Generally, these two ports use two separate, independent (asynchronous) clocks: the read clock (e.g., rclk) for the read port and the write clock (e,g., wclk) for the write port. These RAMs have separate address busses for the read and write operations. When using a dual-ported RAM, both read and write accesses may be performed in the same clock cycle, as long as it is not performed on the same RAM location. Read and write accesses typically both occur on the rising edge of the RAM clock. Alternatively, read and write access may occur on the falling edge of the RAM clock. A dual-ported RAM with surrounding RAM wrapper is illustrated in FIG. 11A.

Figure 11B:
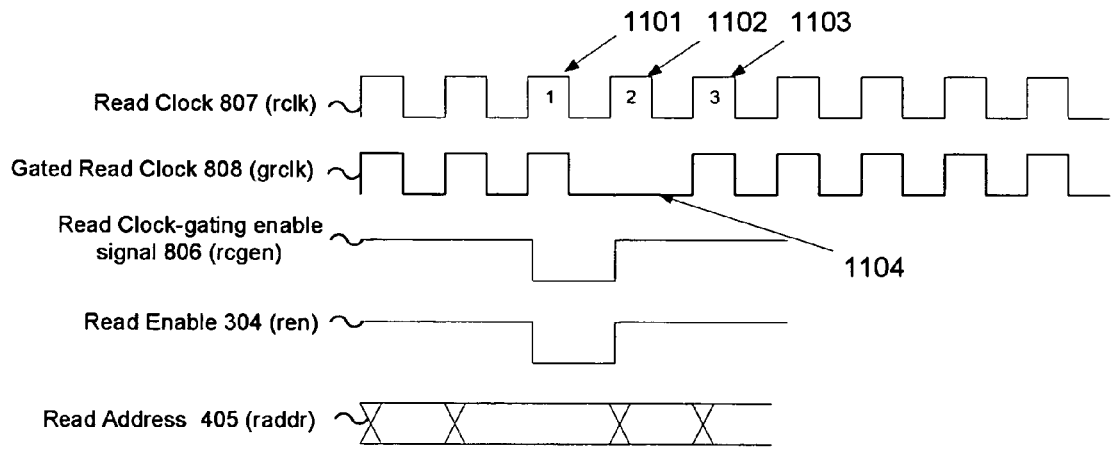
FIG. 11B illustrates a timing diagram of one embodiment of a read access operation of the dual-ported RAM EBB coupled to the clock-gating block of FIG. 11A.
Figure 11C:
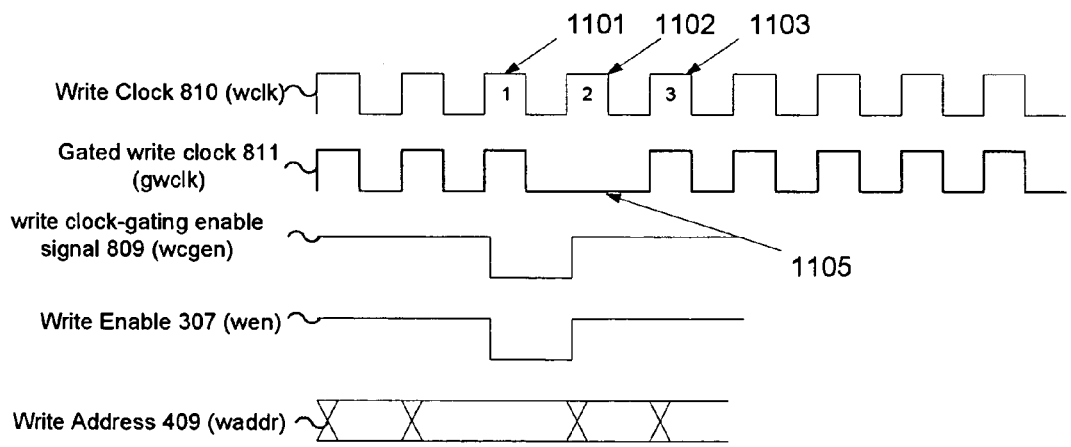
FIG. 11C illustrates a timing diagram of one embodiment of a write access operation of the dual-ported RAM EBB coupled to the clock-gating block of FIG. 11A.

In one embodiment, clock gating may be performed on a RAM EBB, having a dual-ported architecture. The read clock is gated via the read enable 304 and the write clock via the write enable 307, as illustrated in FIG. 11A. The timing of the read and write access are illustrated in FIGS. 11B and 11C. If the read (or write) enable de-asserts on a certain clock, then the RAM read (or write) clock is gated on the following clock cycle, meaning no read (or write) access is being performed in the following clock cycle.

FIG. 4 illustrates a block diagram of one exemplary embodiment of a dual-ported RAM coupled to a clock-gating block. Dual-ported RAM 402 is coupled to clock-gating block 401. Dual-ported RAM 402 receives, as inputs, write enable 307 (e.g., wen), read enable 304 (e.g., ren), write address 409 (e.g., waddr), read address 405 (e.g., raddr) and write data 308 (e.g., wdata) from the core logic 204 within the functional unit 207. Dual-ported RAM 402 provides, as an output, read data 306 (e.g., rdata). When a read access operation is being performed from memory location 410, the dual-ported RAM 402 receives read enable 304 and corresponding read address 405, and outputs the data stored at memory location 410 as read data 306. When a write access operation is being performed in memory location 420, the dual-ported RAM 402 receives write enable 307 and corresponding write address 409, and inputs write data 308 to be stored at memory location 410. Alternatively, read and write access operations may be performed at other memory locations within the dual-ported RAM 402, such as a read access operation at memory location 420 and a write access operation at memory location 410.

Clock-gating block 401 is coupled to clock gate 409 and clock gate 410. Clock-gating block 401 and clock gate 409 gate the RAM clock signal 203 received by the dual-ported RAM 402, and provides a gated clock signal to memory location 410 when the memory location 410 is idle (e.g., no write or read access in the memory location). Clock-gating block 401 and clock gate 411 gate the RAM clock signal 203 received by the dual-ported RAM 402, and provides a gated clock signal to memory location 420 when the memory location 420 is idle (e.g., no write or read access in the memory location). Clock-gating block 401 receives, as inputs, write enable 307 (e.g., wen) and read enable 304 (e.g., ren) from the core logic 204 within the functional unit 207. Write enable 307 and read enable 304 may be used to determine when to gate the RAM clock 203 to be provided to memory locations within the dual-ported RAM 402, which are idle (e.g., no write or read access in the memory location).

Memory locations 410 and 420 in one embodiment are one RAM EBB. Alternatively, memory locations 410 and 420 may include a plurality of RAM EBBs, such as one RAM bank, or a plurality of RAM banks having one or more RAM EBBs.

It should be noted that although illustrated as separate functional blocks, clock-gating blocks 301 and 401, and clock gates 309, 409, and 411, may be one functional block, or alternatively, clock-gating blocks 301 and 401 may include clock gates 309, and 409 and 411, respectively. It should also be noted that although the clock-gating blocks 301 and 401 and clock gates 309, 409, and 411 have been illustrate in FIGS. 3 and 4 as being outside the single- and dual-ported RAMs 302 and 402, clock-gating blocks 301 and 401 and clock gates 309, 409, and 411 may be in the RAM wrapper of single-ported RAM 302 and dual-ported RAM 402, respectively. Similarly, a clock-gating block may be provided for each memory location in the single- or dual-ported RAMs 302 and 402. The memory locations of the single- or dual-ported RAMs may be one single RAM EBB per each memory location, or alternatively, the memory locations may be one or more RAM banks including a plurality of RAM EBBs.

As previously mentioned, in a dual-ported RAM implementation, read and write accesses may occur on a rising edge of the RAM clock 203. In the case of read accesses to the RAM EBB (e.g., RAM EBB 502), if read enable 304 de-asserts in clocks cycles #1, 2, ..., N, then the RAM clock 203 is gated in clock cycles #2, 3, ..., N+1 (e.g., gated clock 504 de-asserts). In the case of write accesses to the RAM EBB, if write enable 307 de-asserts in clock cycles 1, 2, ..., N, the RAM clock 203 is gated (e.g., gated clock 504 de-asserted) in clock cycles #2, 3, ..., N+1 (e.g., gated clock 504 de-asserts).

Figure 5:
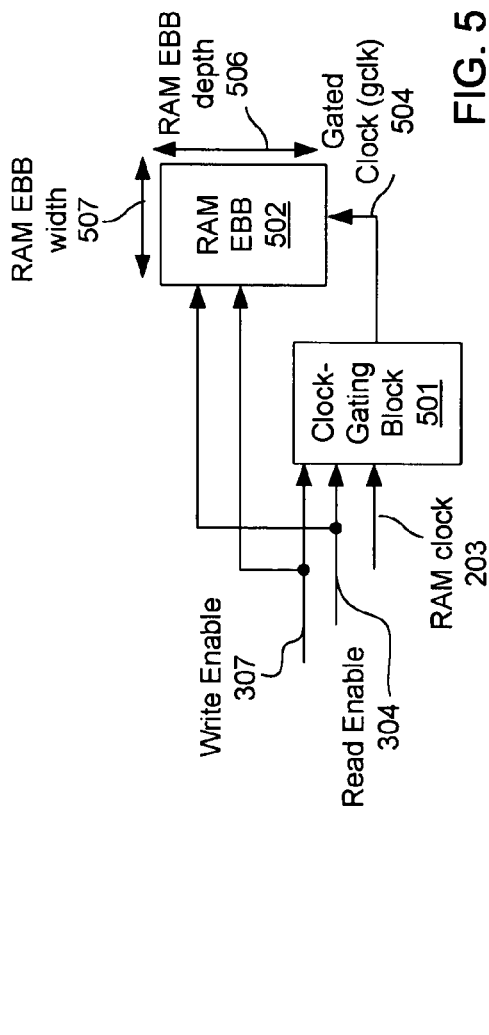
FIG. 5 illustrates a block diagram of one embodiment of a RAM EBB coupled to a clock-gating block.

FIG. 5 illustrates a block diagram of one embodiment of a RAM EBB coupled to a clock-gating block. As previously mentioned, single- or dual-ported RAMs 302 and 402 may include one or more RAM EBBs. RAM EBB 502 is coupled to clock-gating block 501. RAM EBB 502 receives write enable 307 and read enable 307. Clock-gating block 501 receives, as inputs, read enable 304 and write enable 307 from the core logic 204 within the functional unit 207, and RAM clock 203. When neither write enable 307 or read enable 304 are asserted, clock-gating block 501 gates the RAM clock 203, outputting a gated clock on gated clock 504 (e.g., gclk) to be received by RAM EBB 502. When either write enable 307 or read enable 304 are asserted, clock-gating block 501 does not gate the RAM clock 203, outputting an un-gated clock on gated clock 504. In other words, when the RAM clock 203 is gated, gated clock 504 is turned off, and when the RAM clock 203 is not gated, gated clock 504 is turned on, toggling like RAM clock 203. In one embodiment, when RAM clock 203 is not gated, gated clock 504 substantially equals RAM clock 203, meaning gated clock 504 toggles at the same frequency and with the same timing as RAM clock 203.

RAM EBB 502 includes RAM EBB width 507 and RAM EBB depth 506. In one exemplary embodiment, RAM EBB width 507 is 64 bits, and RAM EBB depth is 256 bits. Alternatively, other values for the RAM EBB width and depth 507 and 506 known by those of ordinary skill in the art may be used.

Figure 6:
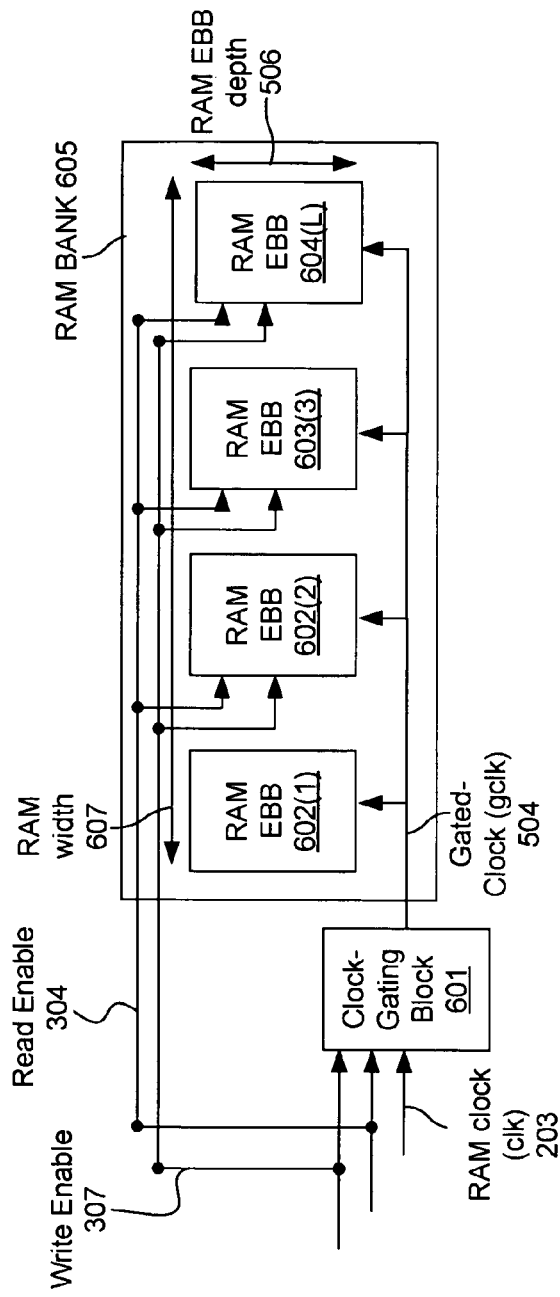
FIG. 6 illustrates a block diagram of one embodiment of a RAM bank, having a plurality of RAM EBBs, coupled to a clock-gating block.

FIG. 6 illustrates a block diagram of one embodiment of a RAM bank, having a plurality of RAM EBBs, coupled to a clock-gating block. In one embodiment, a logical RAM may be organized in a plurality of RAM banks. A RAM bank may include a plurality of RAM EBBs that are accessed together during a read or write access operation. As previously mentioned, single- or dual-ported RAMs 302 and 402 may include one or more RAM banks having one or more RAM EBBs. RAM bank 605 is coupled to clock-gating block 601. RAM bank 605 includes a plurality of RAM EBBs 602(1)-602(L), where L is a positive integer. RAM EBBs 602(1)-602(L) of RAM bank 605 each receive write enable 307 and read enable 307. Clock-gating block 601 receives, as inputs, read enable 304 and write enable 307 from the core logic 204 within the functional unit 207, and RAM clock 203. When neither write enable 307 or read enable 304 are asserted, clock-gating block 501 gates the RAM clock 203, outputting a gated clock on gated clock 504 (e.g., gclk) to be received by RAM EBBs 602(1)-602(L). When either write enable 307 or read enable 304 are asserted, clock-gating block 601 does not gate the RAM clock 203, outputting an un-gated clock on gated clock 504. In other words, when the RAM clock 203 is gated, gated clock 504 is turned off, and when the RAM clock 203 is not gated, gated clock 504 is turned on, toggling like RAM clock 203. In one embodiment, when RAM clock 203 is not gated, gated clock 504 substantially equals RAM clock 203, meaning gated clock 504 toggles at the same frequency and with the same timing as RAM clock 203.

RAM bank 605 includes RAM width 607 and RAM EBB depth 506. In one exemplary embodiment, RAM bank width 607 is 256 bits. In one embodiment, RAM bank width 607 of 256 bits includes four RAM EBBs, having a RAM EBB width (e.g., 507) of 64 bits. Alternatively, RAM bank width 607 of 256 bits may include two RAM EBBs, having a RAM EBB width (e.g., 507) of 128 bits. Alternatively, other values for the RAM width, RAM EBB width, and RAM EBB depth 607, 507, and 506 known by those of ordinary skill in the art may be used. In another exemplary embodiment, a logical RAM may include four RAM banks, having a RAM width 607 of 256 bits and a RAM EBB depth 506 of 256 bits, totaling a total RAM size of 256×1024 bits.

Figure 7:
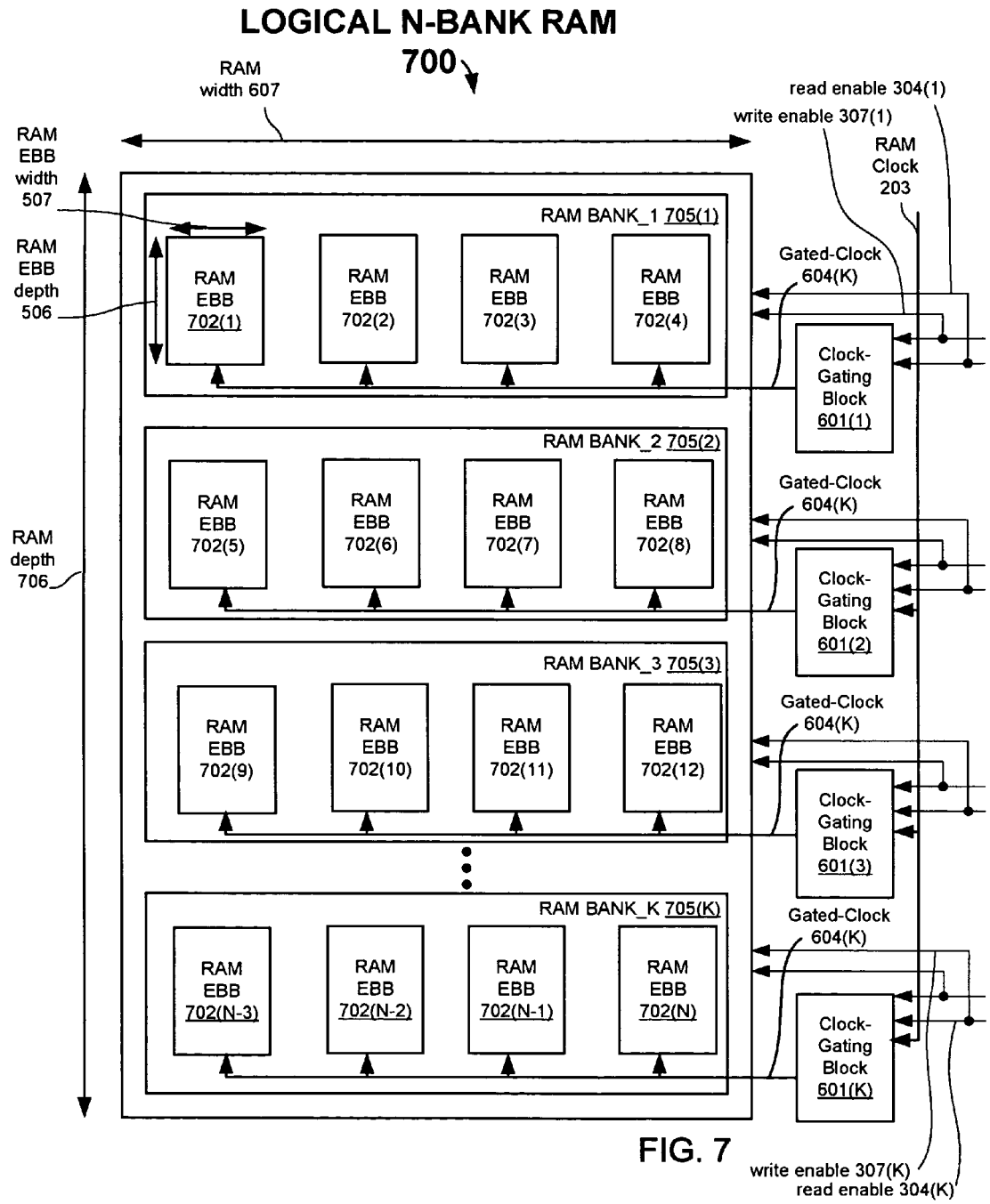
FIG. 7 illustrates a block diagram of one embodiment of a logical N-bank RAM, having a plurality of RAM banks coupled to clock-gating blocks.

FIG. 7 illustrates a block diagram of one embodiment of a logical N-bank RAM, having a plurality of RAM banks coupled to clock-gating blocks. Logical N-bank RAM 700 may include a plurality of RAM banks 705(1)-705(K), where K is a positive integer. Each RAM bank includes four RAM EBBs, for example, RAM EBBs 702(1)-701(4). RAM banks 705(1)-705(K) are coupled to clock-gating blocks 601(1)-601(K). Clock-gating blocks 601(1)-601(K) receive as inputs, the RAM clock 203, and corresponding read and write enable signals 304 and 307, respectively, from the core logic 204 within the functional unit 207. For example, clock-gating block 601(1) receives read enable 304(1), write enable 307(1), and RAM clock 203, and clock-gating block 601(K) receives read enable 304(K), write enable 307(K), and RAM clock 203.

Logical N-Bank RAM 700 includes RAM width 607, and RAM depth 706. In one exemplary embodiment, N=four, meaning Logical RAM 700 includes four RAM banks 705(1)-705(4). In this exemplary embodiment, RAM EBB depth 506 is 256 bits, totaling a RAM depth 706 of 1024 bits. Each RAM bank includes four RAM EBBs, having a RAM EBB width (e.g., 507) of 64 bits, totaling a RAM width 607 of 256 bits. Alternatively, RAM width 607 of 256 bits may include two RAM EBBs, having a RAM EBB width (e.g., 507) of 128 bits. Alternatively, other values for the RAM depth, RAM width, RAM EBB width, and RAM EBB depth 706, 607, 507, and 506 known by those of ordinary skill in the art may be used.

Although the embodiment described with respect to FIG. 7 illustrates and describes four RAM EBBs per bank, alternatively, more or less than four RAM EBBs may be used in a logical RAM, depending on the desired RAM width 607 and RAM EBB width 507, as determined by one of ordinary skill in the art.

Figure 8A:
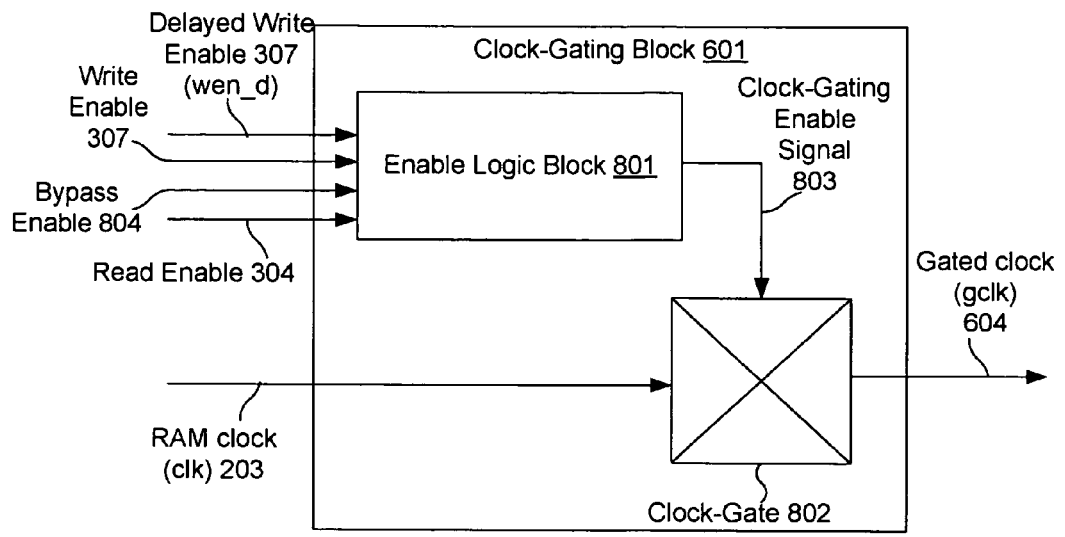
FIG. 8A illustrates a block diagram of one embodiment of a clock-gating block.

FIG. 8A illustrates a block diagram of one embodiment of a clock-gating block. Clock-gating block 601 may include enable logic block 801 and clock gate 802. In one embodiment, enable logic block 801 receives, as inputs, read enable 304 and write enable 307 from core logic 204, and outputs clock-gating enable signal 803 to clock gate 802. In another embodiment, enable logic block 801 also receives, as inputs, bypass enable signal 804, and delayed write enable 805 from core logic 204. Clock gate 802 receives, as inputs, RAM clock 203 (e.g., clk) and clock-gating enable signal 803, and provides, as output, gated clock 504 (e.g., gclk) to the clock input of the one or more RAM EBBs. Although clock gate 802 is illustrated as a functional block of the clock-gating block 601, clock gate 802 and clock-gating block 601 may be separate functional blocks, as previously mentioned.

In one embodiment, clock-gating block 601 may be used in a single-ported RAM architecture, for example, single-ported RAM 302. Alternatively, clock-gating block 601 may be used in a multi-ported RAM architecture known by those of ordinary skill in the art, for example, dual-ported RAM 402. It should be noted that in a single-ported RAM, write enable 307, and not delayed write enable 805, may be used in write accesses of the single-ported RAM.

Figure 8B:
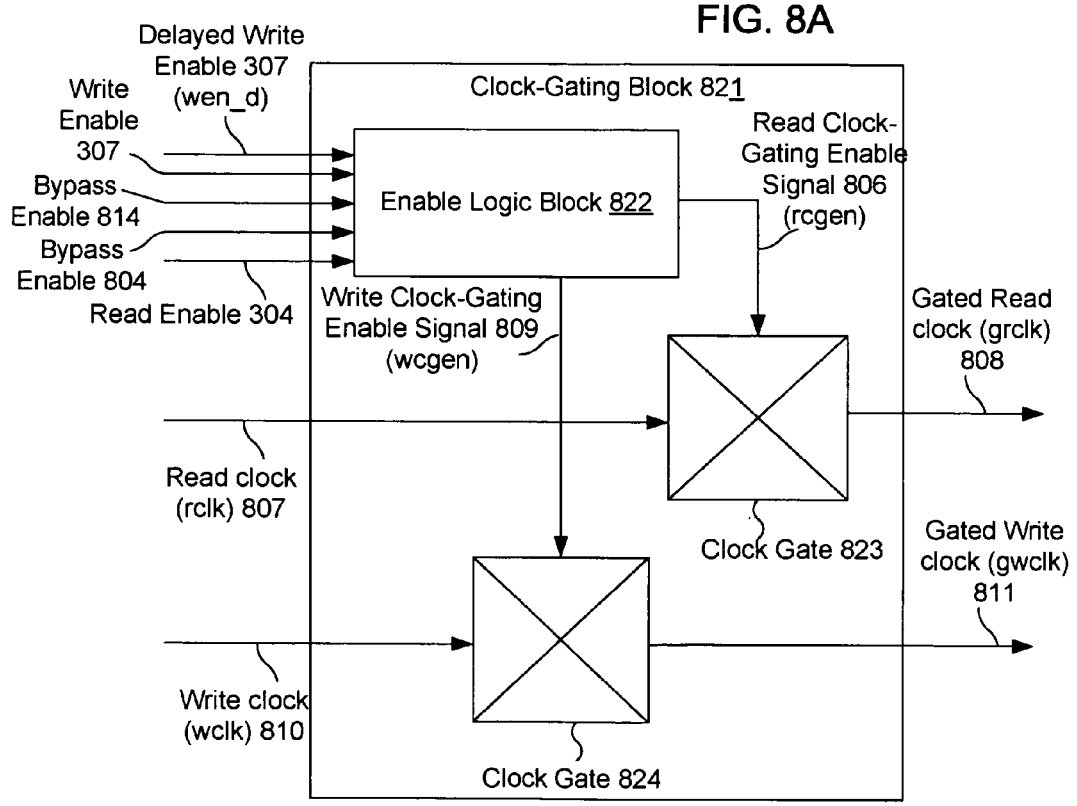
FIG. 8B illustrates a block diagram of another embodiment of a clock-gating block.

FIG. 8B illustrates a block diagram of another embodiment of a clock-gating block. Clock-gating block 821 may include enable logic block 822, clock gate 823, and clock gate 824. In one embodiment, enable logic block 822 receives, as inputs, read enable 304 and write enable 307 from core logic 204, and provides, as outputs, read clock-gating enable signal 806 (e.g., rcgen) to clock gate 823, and write clock-gating enable signal 809 (e.g., wcgen) to clock gate 824. In another embodiment, enable logic block 822 also receives, as inputs, bypass enable signal 804, and bypass enable signal 814 from core logic 204. Clock gate 823 receives, as inputs, read clock 807 (e.g., rclk) and read clock-gating enable signal 806 (e.g., rcgen), and provides, as output, gated read clock 808 (e.g., grclk) to the clock input of the one or more RAM EBBs. Clock gate 824 receives, as inputs, write clock 810 (e.g., wclk) and write clock-gating enable signal 809 (e.g., wcgen), and provides, as output, gated write clock 811 (e.g., gwclk) to the clock input of the one or more RAM EBBs. In one embodiment, write clock 810 (e.g., wclk) and read clock 807 (e.g., rclk) may be the same clock signal, RAM clock 203. Alternatively, write clock 810 and read clock 807 may be independent clock signals. Although clock gates 823 and 824 are illustrated as functional blocks of the clock-gating block 821, clock gate 823 and 824, and clock-gating block 821 may be separate functional blocks, as previously mentioned. In one exemplary embodiment, clock-gating block 821 may be used in a dual-ported RAM, having separate read and write clocks.

Figure 9:
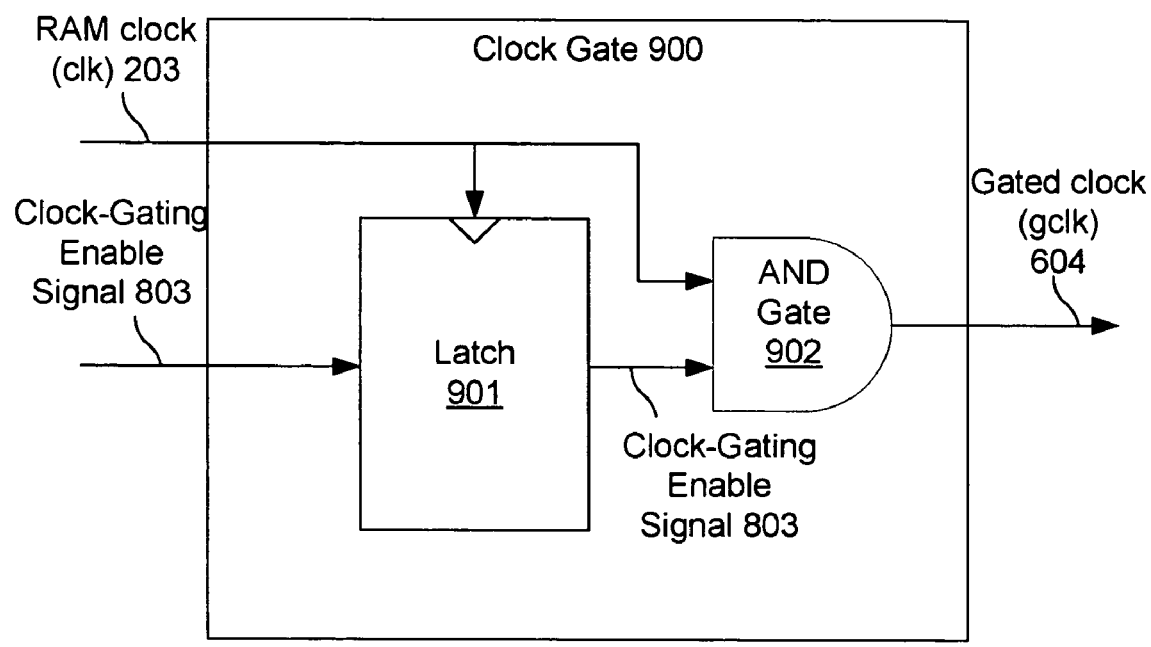
FIG. 9 illustrates a block diagram of one embodiment of a clock gate.

FIG. 9 illustrates a block diagram of one embodiment of a clock gate. Clock gate 900 includes latch 901 and AND gate 902. The AND gate 902 receives, as inputs, RAM clock 203 and clock-gating enable signal 803 signal, and performs an AND operation on the two signals to produce gated clock signal 504. It should be noted that a simple AND gate (e.g., AND gate 902) may cause glitches on the gated clock signal 504 if the clock-gating enable signal 803 switches at the wrong time. In one embodiment, to prevent glitches in gated clock signal 504, latch 902, which may be transparent when RAM clock 203 is low, may be coupled to the input of the AND gate 902. Configurations and operations of clock gates are well known in the art, and thus, a detailed description has not been included so as not to obscure the present embodiments. In one embodiment, clock gate 900 may be used as the clock-gate 802 of FIG. 8A. Alternatively, clock gate 900 may be used as clock gate 823, and/or clock gate 823 of FIG. 8B.

Figure 10A:
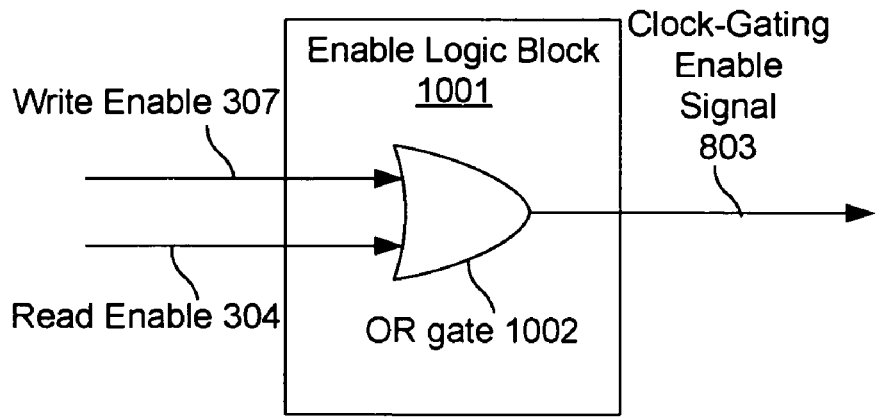
FIG. 10A illustrates a block diagram of one embodiment of an enable logic block.

FIG. 10A illustrates a block diagram of one embodiment of an enable logic block. Enable logic block 1001 includes OR gate 1002. The OR gate 1002 receives, as inputs, write enable 307 (e.g., wen) and read enable 304 (e.g., ren) from the core logic 204 within the functional unit 207, and provides as an output, clock-gating enable signal 803 to clock gate 802.

Figure 10B:
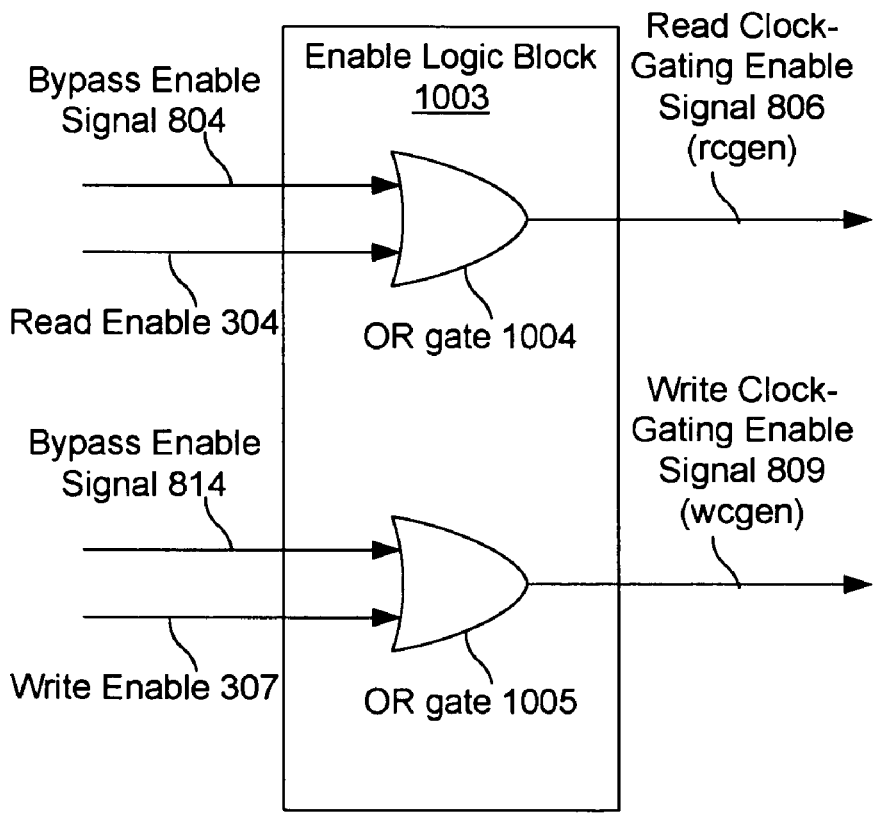
FIG. 10B illustrates a block diagram of another embodiment of an enable logic block.

FIG. 10B illustrates a block diagram of another embodiment of an enable logic block. Enable logic block 1003 includes OR gate 1004 and OR gate 1005. The OR gate 1004 receives, as inputs, read enable 304 (e.g., ren) and bypass enable signal 804 from the core logic 204 within the functional unit 207, and produces, as output, read clock-gating enable signal 806 (e.g., rcgen) to clock gate 821. The OR gate 1005 receives, as inputs, write enable 307 (e.g., wen) and bypass enable signal 314 from the core logic (e.g., core logic 204) within the functional unit 207, and provides as output, write clock-gating enable signal 809 (e.g., wcgen) to clock gate 822. In one embodiment, enable logic block 1003 may be used in multi-ported RAM, such as dual-ported RAM 402. In another embodiment, enable logic block 1003 may be enable logic block 822 of FIG. 8B.

Figure 10C:
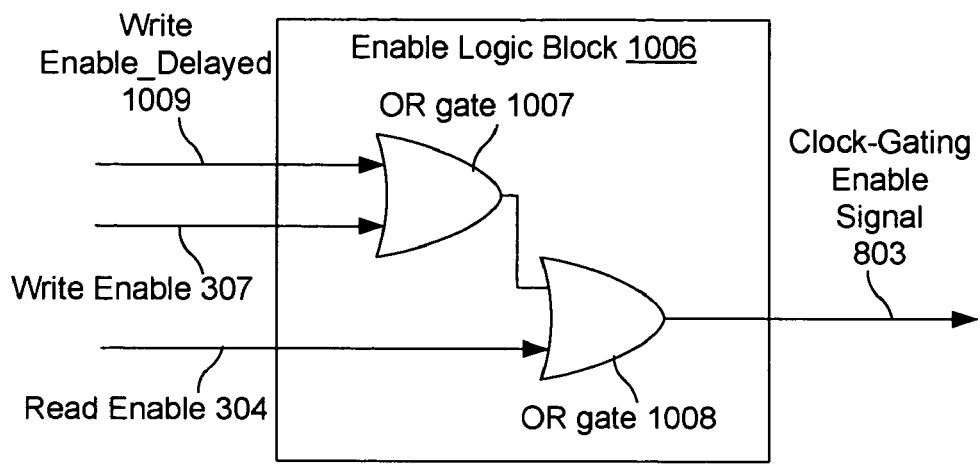
FIG. 10C illustrates a block diagram of another embodiment of an enable logic block.

FIG. 10C illustrates a block diagram of another embodiment of an enable logic block (e.g., clock-gating block 821 including enable logic block 1003 of FIGS. 8B and 10B). Enable logic block 1006 includes OR gate 1007 and OR gate 1008. The OR gate 1007 receives, as inputs, write enable 307 (e.g., wen) and delayed write enable 1009 (e.g., wen_d). The OR gate 1008 receives, as inputs, read enable 304 (e.g., ren) and the output signal from OR gate 1007, and provides, as output, clock-gating enable signal 803 to clock gate 802. It should be noted that delayed write enable 1009 may be used to avoid timing violations, as previously described with respect to a single-ported RAM implementation. In one embodiment, enable logic block 1006 may be used in a single-ported RAM, such as single-ported RAM 302. In another embodiment, enable logic block 1006 may be enable logic block 801 of FIG. 8A.

Figure 10D:
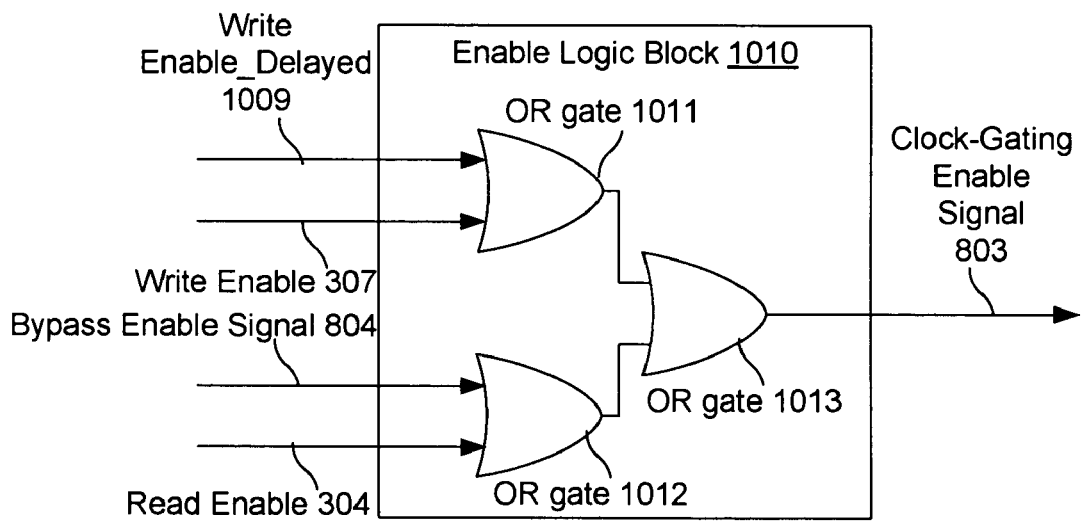
FIG. 10D illustrates a block diagram of another embodiment of an enable logic block.

FIG. 10D illustrates a block diagram of another embodiment of an enable logic block. Enable logic block 1010 includes OR gate 1011, OR gate 1012, and OR gate 1013. The OR gate 1011 receives, as inputs, write enable 307 (e.g., wen) and delayed write enable 1009 (e.g., wen_d). The OR gate 1012 receives, as inputs, read enable 304 (e.g., ren) and bypass enable signal 804. The OR gate 1013 receives, as inputs, the output signals from OR gate 1011 and OR gate 1012, and provides, as output, clock-gating enable signal 803 to clock gate 802. In one embodiment, enable logic block 1010 may be used in a single-ported RAM, such as single-ported RAM 302. In another embodiment, enable logic block 1010 may be enable logic block 801 of FIG. 8A.

Bypass enable signal 804 and 814 of FIGS. 8A, 8B, and 10B may be an enable signal to enable/disable the RAM clock-gating feature within the design. Bypass enable signal 804 may be used to enable/disable the enable logic blocks 1001, 1005, or 1010, which generate clock-gating enable signal 803. The bypass may allow enabling/disabling the RAM clock-gating feature after the design has been manufactured on a chip. Alternatively, the bypass enable signal 804 may be used to enable/disable the read clock-gating enable signal 806, and the bypass enable signal 814 may be used to enable/disable the write clock-gating enable signal 809. In one embodiment, bypass enable signals 804 and 814 may be the same enable signal received from core logic 204. Alternatively, bypass enable signals 804 and 814 may be separate, independently generated signals by the core logic 204.

FIG. 11A illustrates one exemplary embodiment of a dual-ported RAM EBB coupled to a clock-gating block. Functional Unit 207 includes RAM EBB wrapper 1110 and core logic 204, which may include combinational or sequential logic. RAM EBB wrapper 1110 includes RAM EBB 502. In this embodiment, RAM EBB 502 has a dual-ported RAM architecture. Accordingly, RAM EBB 502 receives, as inputs, read enable 304, write enable 307, write address 409, read address 405, and write data 308 from core logic 204. RAM EBB 502 is coupled to clock-gating block, such as clock-gating block 821, having enable logic block 1003 of FIGS. 8B and 10B. Clock gating block includes two OR gates (e.g., 1004 and 1005), which receive read enable signal 304 and bypass enable 804, and write enable 307 and bypass enable 814, respectively, from core logic 204, and provide, as outputs, read clock-gating enable signal 806, and write clock-gating enable signal 809, respectively. Read and write clock-gating enable signals 806 and 809 are used to activate the clock gates (e.g., 823 and 824) for gating read clock 807 and write clock 810, and to provide, as outputs, gated read clock 808 and gated write clock 811.

It should be noted that RAM EBB wrapper 1110 includes multiplexers. These multiplexers are used for operations of a Design-For-Testability (DFT) Lib Component within the functional unit 207. Details regarding the DFT Lib Component and corresponding signals are well known in the art and have not been included so as to not obscure the present embodiments.

It should also be noted that core logic 204 of FIG. 11A has been illustrated as four separate blocks for illustration purposes only.

The timing of the read and write access are illustrated in FIGS. 11B and 11C. If the read (or write) enable de-asserts on a certain clock, then the RAM read (or write) clock is gated on the following clock cycle, meaning no read (or write) access is being performed in the following clock cycle.

FIG. 11B illustrates a timing diagram of one embodiment of a read access operation of the dual-ported RAM EBB coupled to the clock-gating block of FIG. 11A. In this exemplary, clock-gating block is coupled to one RAM EBB and receives read clock 807 and write clock 810 (described with respect to FIG. 11C). As previously described, the clock-gating block 821 of FIG. 8B may be implemented with a dual-ported RAM architecture, one port used for read access operations, and another port used for write access operations. For the read access operation, clock-gating block 821 receives read clock 807 (e.g., rclk), read enable 304 (e.g., ren), and read address 405 (e.g., raddr). Clock-gating block 821 determines if the RAM EBB is idle using read enable 304. If read enable 304 is de-asserted, then clock-gating block 821 asserts the read clock-gating enable signal 806 (e.g., rcgen) received by clock gate 823 to gate, or turn off, the read clock 807 received by the RAM EBB. If read enable 304 is asserted, then clock-gating block 821 de-asserts the read clock-gating enable signal 806 received by clock gate 823, allowing the gated read clock 808 to toggle like the read clock 807. In other words, when a read enable signal 304 is received by the RAM EBB, the RAM EBB receives a toggling gated read clock 808, which is equal to the read clock 807, and when no read enable signal 304 is being received by the RAM EBB, the RAM EBB receives a de-asserted clock signal (e.g., non-toggling clock signal).

In one embodiment, the read access may be configured to occur on the rising edge of the read clock 807. Alternatively, the read access may be configured to occur on the falling edge of the read clock 807. Clock-gating block 821 detects that no read access operation is occurring upon receiving de-asserted read enable signal 304 and generates read clock-gating enable signal 806 during first clock cycle 1101 of read clock 807. The RAM EBB may use an input latch to receive the read enable signal 804. At the next rising edge of read clock 807, second clock cycle 1102 of read clock 807, gated read clock 808 is turned off (e.g., not toggling). For the next clock cycle, third clock cycle 1103 of read clock 807, the RAM EBB receives a de-asserted clock signal (e.g., non-toggling clock signal) at point 1104. Subsequently, read enable 304 is asserted again during the second clock cycle 1102 of read clock 807, turning off the read clock-gating enable signal 806, which consequently, un-gates, or turns on, the gated read clock 808 received by the RAM EBB (e.g., toggling clock signal) during the third clock cycle 1103 of read clock 807. As previously mentioned, power consumed by the logical RAM may be reduced by turning off the clock signal received by idle RAM EBBs. In one exemplary embodiment, the read clock 807 received by the RAM EBB may be gated for only a single clock cycle (e.g., the second clock cycle 1102 of read clock 807) at point 1104, in which the RAM EBB is idle, reducing the power consumed by the RAM EBB.

FIG. 11C illustrates a timing diagram of one embodiment of a write access operation of the dual-ported RAM EBB coupled to the clock-gating block of FIG. 11A. For the write access operation, clock-gating block 821 receives write clock 810 (e.g., wclk), write enable 307 (e.g., wen), and write address 405 (e.g., raddr). Clock-gating block 821 determines if the RAM EBB is idle using write enable 307. If write enable 307 is de-asserted, then clock-gating block 821 asserts the write clock-gating enable signal 809 (e.g., wcgen) received by clock gate 824 to gate, or turn off, the write clock 810 received by the RAM EBB. If write enable 307 is asserted, then clock-gating block 821 de-asserts the write clock-gating enable signal 809 received by clock gate 824, allowing the gated write clock 811 to toggle like the write clock 810. In other words, when a write enable signal 307 is received by the RAM EBB, the RAM EBB receives a toggling gated write clock 811, which is equal to the write clock 810, and when no write enable signal 307 is being received by the RAM EBB, the RAM EBB receives a de-asserted clock signal (e.g., non-toggling clock signal).

In one embodiment, the write access may be configured to occur on the rising edge of the write clock 810. Alternatively, the read access may be configured to occur on the falling edge of the write clock 810. Clock-gating block 821 detects that no write access operation is occurring upon receiving de-asserted write enable signal 307 and generates write clock-gating enable signal 809 during first clock cycle 1101 of write clock 810. The RAM EBB may use an input latch to receive the read enable signal 804. At the next rising edge of write clock 810, second clock cycle 1102 of write clock 810, gated write clock 811 is turned off (e.g., not toggling). For the next clock cycle, third clock cycle 1103 of write clock 810, the RAM EBB receives a de-asserted clock signal (e.g., non-toggling clock signal) at point 1105. Subsequently, write enable 807 is asserted again during second clock cycle 1102 of write clock 810, turning off the write clock-gating enable signal 809, which consequently, un-gates, or turns on, the gated write clock 811 received by the RAM EBB (e.g., toggling clock signal) during the third clock cycle 1103 of write clock 810. As previously mentioned, power consumed by the logical RAM may be reduced by turning off the clock signal received by idle RAM EBBs. In one exemplary embodiment, the write clock 810 received by the RAM EBB may be gated for only a single clock cycle (e.g., the second clock cycle 1102 of write clock 810) at point 1105, in which the RAM EBB is idle, reducing the power consumed by the RAM EBB.

As previously mentioned, write clock 810 (e.g., wclk) and read clock 807 (e.g., rclk) may be the same clock signal, RAM clock 203 (e.g., clk). Alternatively, write clock 810 and read clock 807 may be independent clock signals.

FIG. 12A illustrates one exemplary embodiment of a single-ported RAM EBB coupled to a clock-gating block (e.g., clock-gating block 601 including enable logic block 1010 of FIGS. 8A and 10D). Functional unit 207 includes RAM EBB wrapper 1110 and core logic 204, which may include combinational or sequential logic. RAM EBB wrapper 1210 includes RAM EBB 502, and flip-flops 1201 and 1202 coupled to the RAM EBB 502. In this embodiment, RAM EBB 502 has a single-ported RAM architecture. Accordingly, RAM EBB 502 receives, as inputs, read enable 304, delayed write enable 1009, delayed write address 1208, read address 405, and write data 308 from core logic 204. RAM EBB 502 is coupled to clock-gating block, such as clock-gating block 601, having enable logic block 1010 of FIGS. 8A and 10D. Clock gating block 601 includes two OR gates (e.g., 1011 and 1012), which receive read enable signal 304 and bypass enable 804, and write enable 307 and delayed write enable 1009, respectively, from core logic 204. The outputs of the two OR gates (e.g., 1011 and 1012) are coupled to a third OR gate (e.g., 1013), which provides, as an output, clock-gating enable signal 803. Clock-gating enable signal 803 is used to activate the clock gate (e.g., 802) for gating RAM clock 203, and to provide, as an output, gated clock 504.

It should be noted that RAM EBB wrapper 1210 includes multiplexers. These multiplexers are used for operations of a DFT Lib Component within the functional unit 207. Details regarding the DFT Lib Component and corresponding signals are well known in the art and have not been includes so as to not obscure the present embodiments.

It should also be noted that core logic 204 of FIG. 11A has been illustrated as three separate blocks for illustration purposes only.

The timing of the read and write access are illustrated in FIGS. 12B and 12C. If the read or write enables de-asserts on a certain clock, then the RAM clock is gated on the following clock cycle for a read operation and a subsequent clock cycle (e.g., two clock cycles) for a write operation. It should be noted that since both the RAM read and write ports use the same clock, both the read and write enables need to be de-asserted before the RAM clock can be gated.

It should be noted that using a single-ported RAM implementation may generate a timing-critical path on the RAM write address and write-enable path. More specifically, the logic that surrounds the RAM usually generates the RAM control signals (e.g. read or write address, read or write enable) on the rise of the RAM clock. However, if the write address and enable are generated on the rise of the clock but are sampled by the RAM EBB on the falling edge of the clock, these signals do not have a full clock cycle to propagate to the RAM EBB, but only half a clock cycle. This may generate timing problems, especially in the case when the logic that generates the RAM signals uses a lot of combinational gates, which consequently add delay on the path to the RAM EBB. Half-cycle paths may meet timing when there are few or no combinational gates from the source flop to the destination RAM EBB, but may not meet timing when there are a lot of gates on the path from the source flop to the RAM EBB. In one embodiment, in order to solve the potential timing problem on the RAM write address and enable signals, flip-flops (e.g., 1201 and 1202) may be added in the RAM EBB wrapper to be coupled between the RAM EBB and the source logic outside the RAM EBB wrapper. The flip-flops sample the write address 409 and write enable 307 signals to provide delayed write address 1208 and delayed write enable 1009, as illustrated in FIGS. 12B and 12C. The path from the source of the write address/enable signals to the RAM wrapper starts at the rise of the clock and ends at the rise of the clock as well (i.e. at the added flops in the RAM EBB, which sample the write address/enable on the rise of the clock). Even if this is a long timing path, it has a full clock cycle to propagate from the source logic to the added flip-flops. On the other side, the path from the added flops in the RAM wrapper to the RAM EBB starts on the rise of the clock (at the flops) and ends at the RAM EBB itself on the falling edge of the clock. In other words, it is a half-cycle path. The path between the added flops and the RAM EBB may allow the signals to propagate from the added flops and the RAM EBB in half a clock cycle to facilitate write and read access in the RAM EBB on the same clock cycle.

As a result, the write address/enable signals that the RAM EBB sees are delayed by a clock with respect to the write address/enable signals that the logic outside the RAM wrapper generates. It should be noted that in the read operation there is no added flop (added delay) on the read address 405 and read enable signals 304.

Now, the fact that the write enable at the EBB is delayed by a clock and is sampled by the EBB at falling edge of the clock may make the generation of the RAM clock-gating signal slightly more complex, as compared to the case of the dual-ported RAM. In order to generate the clock-gating enable signal, write-enable signal and delayed write-enable may be used. This may increase the complexity of the timing for the write access in the single-ported RAM EBB compared to the read and write accesses in the dual-ported RAM EBB. However, the timing for the read access in the single-ported RAM EBB may be the same complexity of the timing for the read and write accesses in the dual-ported RAM EBB.

The complexity of the write-access timing may lie in the fact that, when the external logic de-asserts the write enable, the write enable signal gets delayed by one clock cycle in the RAM wrapper, before it makes it to the RAM EBB. More specifically, if the RAM write enable de-asserts on clock cycle N, then the delayed write-enable that the RAM EBB sees gets de-asserted on clock cycle N+1. Given that the RAM samples the delayed write-enable on the falling edge of the clock, it can only sample it on the falling edge of clock cycle N+1. Therefore, clock N+1 should not be gated because if it did, the RAM would not know that the write enable has de-asserted and would not be able to turn off internal circuitry (e.g. sense amps) to save power. Therefore, the RAM clock may only get gated starting from clock cycle N+2. This results in the RAM clock not being gated one cycle after the write-enable de-asserts, but rather two cycles after the write-enable de-asserts, as illustrated in FIG. 12C.

FIG. 12B illustrates a timing diagram of one embodiment of a read access operation of the single-ported RAM EBB coupled to the clock-gating block of FIG. 12A. In this exemplary, clock-gating block is coupled to one RAM EBB and receives RAM clock 203. As previously described, the clock-gating block 601 of FIG. 8A may be implemented with a single-ported RAM architecture, one port used for read and write access operations. For the read access operation, clock-gating block 601 receives RAM clock 203 (e.g., clk), read enable 304 (e.g., ren), and memory address 305 (e.g., addr). Clock-gating block 601 determines if the RAM EBB is idle using read enable 304. If read enable 304 is de-asserted, then clock-gating block 601 asserts the clock-gating enable signal 803 (e.g., cgen) received by clock gate 802 to gate, or turn off, the RAM clock 203 received by the RAM EBB. If read enable 304 is asserted, then clock-gating block 601 de-asserts the clock-gating enable signal 803 received by clock gate 802, allowing the gated clock 504 to toggle like the RAM clock 203. In other words, when a read enable signal 304 is received by the RAM EBB, the RAM EBB receives a toggling gated clock 504, which is equal to the RAM clock 203, and when no read enable signal 304 is being received by the RAM EBB, the RAM EBB receives a de-asserted clock signal (e.g., non-toggling clock signal).

In one embodiment, the read access may be configured to occur on the rising edge of the RAM clock 203 and the write access to occur on the falling edge of the RAM clock 203. Alternatively, the read access may be configured to occur on the falling edge of the RAM clock 203 and the write access to occur on the rising edge of the RAM clock 203. Clock-gating block 601 detects that no read access operation is occurring upon receiving de-asserted read enable signal 304 and generates clock-gating enable signal 803 during first clock cycle 1201 of RAM clock 203. The RAM EBB may use an input latch to receive the read enable signal 304. At the next rising edge of RAM clock 203, second clock cycle 1201 of RAM clock 203, gated clock 504 is turned off (e.g., not toggling). For the next clock cycle, third clock cycle 1203 of RAM clock 203, the RAM EBB receives a de-asserted clock signal (e.g., non-toggling clock signal) at point 1205. Subsequently, read enable 304 is asserted again during the second clock cycle 1202 of RAM clock 203, turning off the clock-gating enable signal 803, which consequently, un-gates, or turns on, the gated clock 504 received by the RAM EBB (e.g., toggling clock signal) during the third clock cycle 1203 of RAM clock 203. As previously mentioned, power consumed by the logical RAM may be reduced by turning off the clock signal received by idle RAM EBBs. In one exemplary embodiment, the RAM clock 203 received by the RAM EBB may be gated for only a single clock cycle (e.g., second clock cycle 1202) at point 1205, in which the RAM EBB is idle, reducing the power consumed by the RAM EBB.

FIG. 12C illustrates a timing diagram of one exemplary embodiment of a write access operation of the single-ported RAM EBB coupled to the clock-gating block of FIG. 12A. For the write access operation, clock-gating block 601 receives RAM clock 203 (e.g., clk), write enable 307 (e.g., wen), and memory address 305 (e.g., addr). Clock-gating block 601 determines if the RAM EBB is idle using write enable 307. If write enable 307 is de-asserted, then clock-gating block 601 asserts the clock-gating enable signal 803 (e.g., cgen) received by clock gate 802 to gate, or turn off, the RAM clock 203 received by the RAM EBB. If write enable 307 is asserted, then clock-gating block 601 de-asserts the clock-gating enable signal 803 received by clock gate 802, allowing the gated clock 504 to toggle like the RAM clock 203. In other words, when a write enable signal 307 is received by the RAM EBB, the RAM EBB receives a toggling gated clock 504, which is equal to the RAM clock 203, and when no write enable signal 307 is being received by the RAM EBB, the RAM EBB receives a de-asserted clock signal (e.g., non-toggling clock signal).

In one embodiment, the read access may be configured to occur on the rising edge of the RAM clock 203 and the write access to occur on the falling edge of the RAM clock 203. Alternatively, the read access may be configured to occur on the falling edge of the RAM clock 203 and the write access to occur on the rising edge of the RAM clock 203. Clock-gating block 601 detects that no write access operation is occurring upon receiving de-asserted write enable signal 307 and generates clock-gating enable signal 803 during first clock cycle 1201 of RAM clock 203. The RAM EBB may use an input latch to receive the read enable signal 804. At the next rising edge of RAM clock 203, second clock cycle 1202 of RAM clock 203, gated clock 504 is turned off (e.g., not toggling). For the next clock cycle, third clock cycle 1203 of RAM clock 203, the RAM EBB receives a de-asserted clock signal (e.g., non-toggling clock signal) at point 1206. Gated clock 504 remains off during the next clock cycle, fourth clock cycle of RAM clock 203. Subsequently, write enable 807 is asserted again during third clock cycle 1203 of RAM clock 203, turning off the clock-gating enable signal 803 at point 1206, which consequently, un-gates, or turns on, the gated clock 504 received by the RAM EBB (e.g., toggling clock signal) during the fourth clock cycle 1204 of RAM clock 203. As previously mentioned, power consumed by the logical RAM may be reduced by turning off the clock signal received by idle RAM EBBs. In one exemplary embodiment, the RAM clock 203 received by the RAM EBB may be gated for only a single clock cycle, in which the RAM EBB is idle, reducing the power consumed by the RAM EBB. In the exemplary embodiment of FIG. 12C, the RAM EBB is gated for two clock cycles (e.g., second and third clock cycles 1202 and 1203) at point 1206, in which the RAM EBB is idle, reducing the power consumed by the RAM EBB.

As previously mentioned, on a read access, the RAM EBB read address 305 and read enable 304 may be set up with respect to the rising edge of the RAM clock 203. On a write access, the RAM EBB write address 305, write data 308 and write enable 307 may be set up with respect to the falling edge of the RAM clock 203. On each clock, both a read access (rising edge) and a write access (falling edge) may be performed. Alternatively, the read access may be on the falling edge, and the write access operation may be on the rising edge.

It should be noted that read address and write address of FIGS. 12B and 12C have been illustrated as two separate write and read address busses 409 and 305 in the single-ported RAM, but the write and read address buses 409 and 305 may be the same bus (e.g., memory address 305). The two address buses may be multiplexed internally to the RAM EBB, from the memory address 305.

It should be noted that all waveforms other than those for the gated clock 504 (e.g., gclk) and clock-gating enable signal 803 (e.g., cgen) apply to the RAM EBB read/write accesses with or without the added clock gating feature. In other words, the clock-gating feature does not affect the timing of the RAM read or write accesses and may be transparent to the designers who use the RAM EBB in their logic. More specifically, the gated clock 504, representative of the RAM clock 203, received by the RAM EBB may be gated on every clock when the RAM EBB is not accessed for a read access operation. In the case of write accesses, the RAM clock may be gated on every cycle that the RAM EBB is not accessed for a write access operation, except for the first one clock cycle. In both cases, by gating the clock cycle when the RAM EBB is idle may result in idle power savings in the RAM EBB.

It should be noted that delayed write enable 1009 (e.g., wen_d) and delayed write address 1208 (e.g., waddr_d) may be used to convert a half-a-cycle path for write accesses to a full-cycle timing path, as seen by logic outside of the RAM EBB. In order to generate the delayed write enable 1009 and delayed memory address 1208, the read enable 304, read address 405 and write data 308 signals are not flopped inside the RAM EBB wrapper, whereas the write enable 307 and write address 409 are flopped (delayed) by flip-flops inside the wrapper. This may result in the gated clock 504 toggling the first clock cycle 1201 after determining that the RAM EBB is idle, as illustrate in FIG. 12C.

Figure 13:
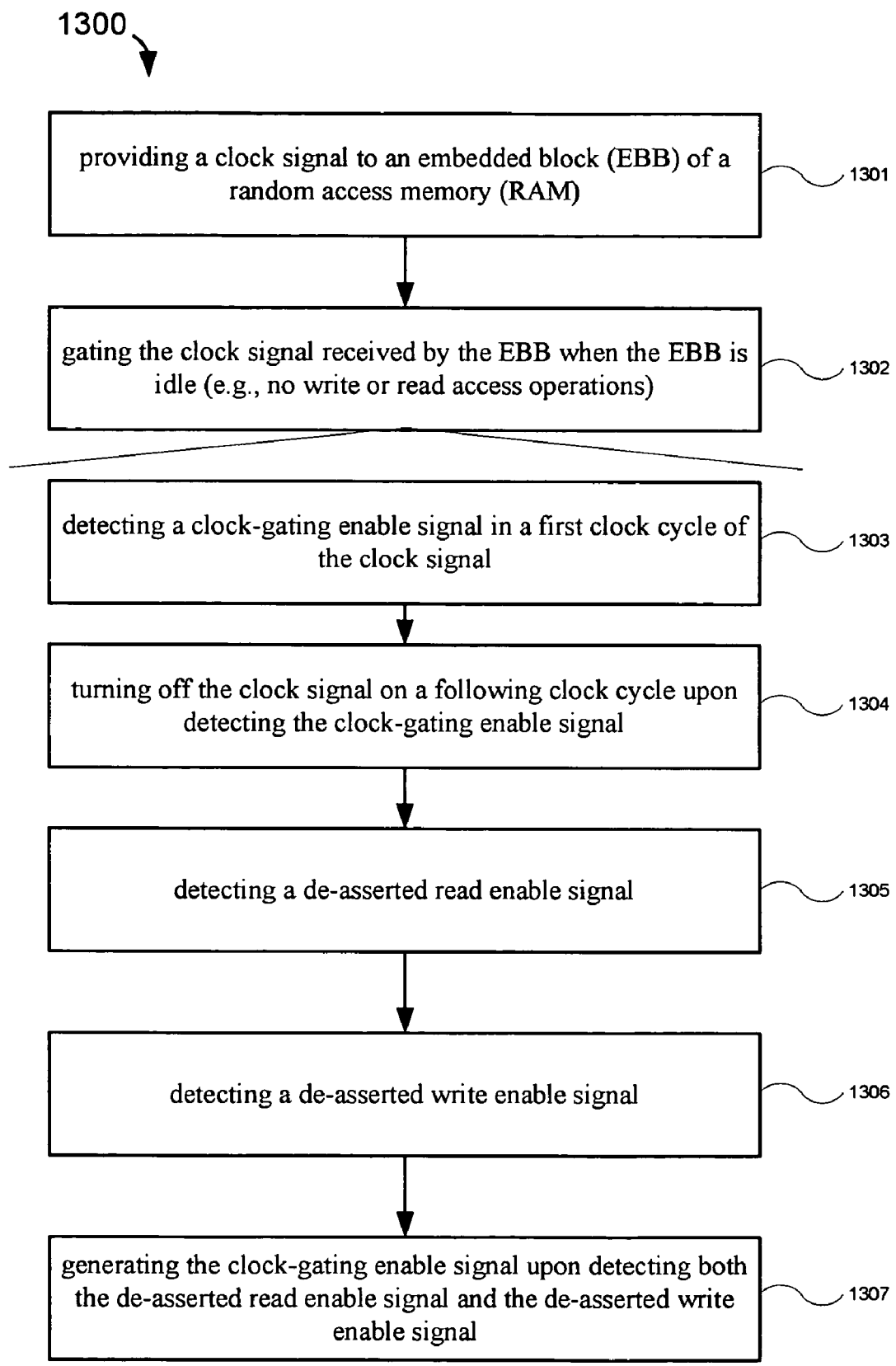
FIG. 13 illustrates a flow chart of one embodiment of a method for gating a clock signal received by a RAM EBB when the RAM EBB is idle.

FIG. 13 illustrates a flow chart of one embodiment of a method for gating a clock signal received by a RAM EBB when the RAM EBB is idle. Method 1300 includes providing a clock signal to an embedded block (EBB) of a random access memory (RAM), operation 1301, and gating the clock signal received by the EBB when the EBB is idle, operation 1302. The RAM EBB may be idle when no write or read access operations are being performed on the RAM EBB. Operation 1302 of gating the clock signal may further include detecting a clock-gating enable signal in a first clock cycle of the clock signal, operation 1303, and turning off the clock signal on a following clock cycle upon detecting the clock-gating enable signal, operation 1304. In another embodiment, the method may further include detecting a de-asserted read enable signal, operation 1305, detecting a de-asserted write enable signal, operation 1306; and generating the clock-gating enable signal upon detecting both the de-asserted read enable signal and the de-asserted write enable signal, operation 1307. In one embodiment, the following clock cycle may be the next clock cycle after the first clock cycle upon detecting the de-asserted read enable signal. In another embodiment, the following clock cycle may be a subsequent clock cycle, for example, two clock cycles after the first clock cycle upon detecting the de-asserted write enable signal.

In another embodiment, the method may include providing a clock signal to an embedded block (EBB) of a random access memory (RAM), operation 1301, gating the clock signal received by the EBB when the EBB is idle, operation 1302, and providing a bank having the EBB and one or more additional EBBs, and gating the clock signal received by the bank when the bank is idle.

It should be noted that RAM power dissipation may be reduced by clock-gating individual RAM EBBs or banks whenever they are idle (e.g., no read or write access operation). It should also be noted that clock-gating may be done on idle EBBs/banks regardless of whether there is another EBB/bank in the same logical RAM which is being accessed (e.g., read or write access operations) on the same clock.

In one embodiment, the method may include providing a clock signal to an embedded block (EBB) of a random access memory (RAM), operation 1301, and gating the clock signal received by the EBB when the EBB is idle, operation 1302, as previously described, and providing the clock signal to one or more additional EBBs of the RAM; and un-gating the clock signal to the one or more additional EBBs of the RAM when the one or more additional EBBs are not idle while gating the clock signal received by the EBB when the EBB is idle.

In another embodiment, the method may include providing a clock signal to an embedded block (EBB) of a random access memory (RAM), operation 1301, gating the clock signal received by the EBB when the EBB is idle, operation 1302, as previously described, and providing a bank having the EBB and one or more additional EBBs, gating the clock signal received by the bank when the bank is idle, providing the clock signal to one or more additional banks of the RAM; and un-gating the clock signal to the one or more additional banks of the RAM when the one or more additional banks are not idle while gating the clock signal received by the bank when the bank is idle.

As previously mentioned, power may be saved when RAM banks which are not accessed on a given cycle are clock-gated. The method and apparatus of implementing the clock gating inside the RAM EBB wrapper may be implemented in larger, multi-bank RAMs, as well as smaller, multi- or single-bank RAMs in the design.

The method and apparatus may provide clock gating, on a cycle-by-cycle basis. In other words, the RAM clock will be gated on every clock cycle when this is possible. The clock-gating scheme may be designed and validated inside the wrapper in a centralized way, so its efficiency does not depend on each individual designer who uses a RAM in his or her logic.

It should be noted that in one embodiment, in order for this RAM clock-gating scheme (i.e. in the RAM EBB and RAM bank levels) to provide maximum power savings in the case of a multi-bank RAM, logic needs to ensure that each RAM bank has its read enable signal de-asserted at all times, except when data actually needs to be read out of the RAM.

In one exemplary embodiment, based on the bank-organization of the four largest multi-bank 3D Graphics RAMs, clock-gating the RAMs efficiently may save 350 mw of active power in the functional unit. In this exemplary embodiment, the architecture includes 2 banks in a mapping cache, 4 banks in an instruction cache, 4 banks in the URB, and 2 banks in a Latency FIFO; only one bank in the above mentioned RAMs can be accessed for a read operation on each clock. Also, a 50% miss rate was assumed for the caches mentioned above, i.e. one cache bank is accessed every other clock. Clock gating the 2D Display RAMs can save another 150 mw of average or TDP power. All RAMs above combined can save up to 500 mw of power if properly clock gated, as this invention describes. Alternatively, the power savings may be higher, using a larger RAM space in the functional unit.

Figure 14:
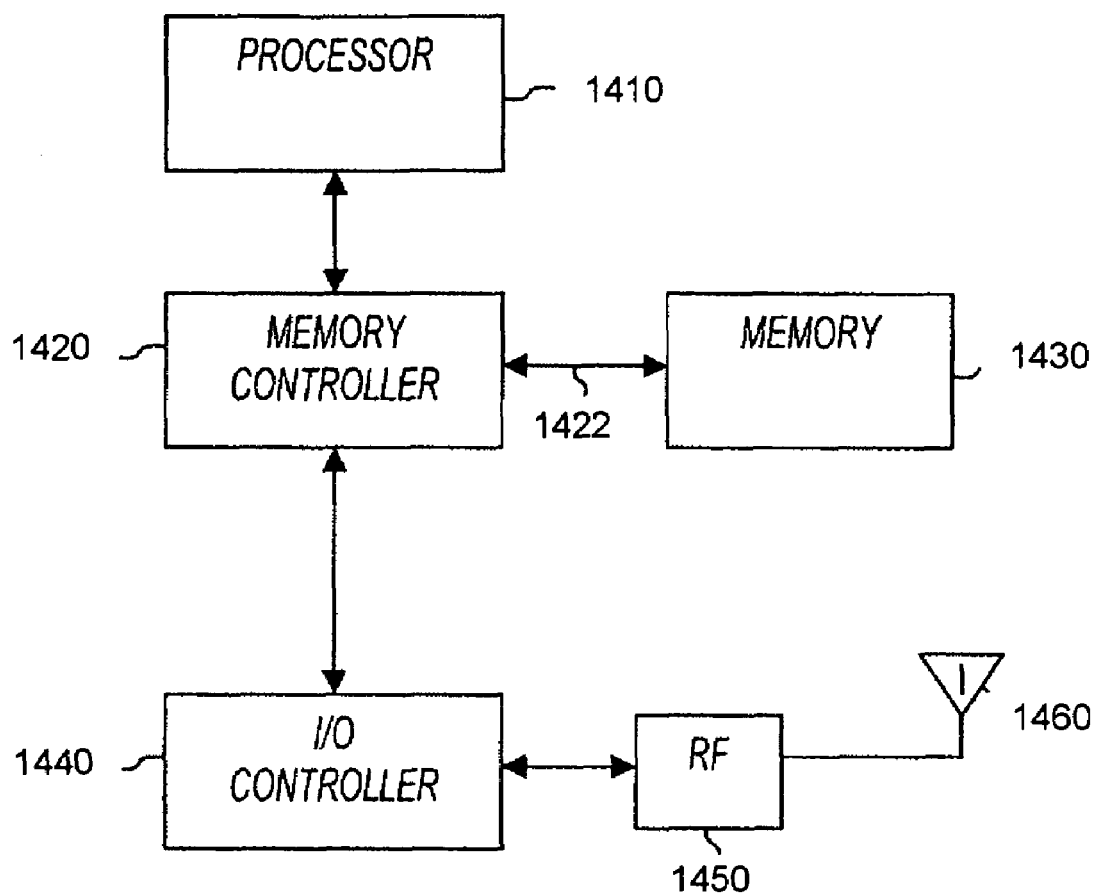
FIG. 14 illustrates an electronic system in accordance with various embodiments of the present invention.

FIG. 14 illustrates an electronic system in accordance with various embodiments of the present invention. Electronic system 1400 includes processor 1410, memory controller 1420, memory 1430, input/output (I/O) controller 1440, radio frequency circuits (RF) 1450, and antenna 1460. In operation, system 1400 sends and receives signals using antenna 1460, and these signals are processed by the various elements shown in FIG. 14. Antenna 1460 may be a directional antenna or an omni-directional antenna. As used herein, the term omni-directional antenna refers to any antenna having a substantially uniform pattern in at least one plane. For example, in some embodiments, antenna 1460 may be an omni-directional antenna such as a dipole antenna, or a quarter wave antenna. Also for example, in some embodiments, antenna 1460 may be a directional antenna such as a parabolic dish antenna, a patch antenna, or a Yagi antenna. In some embodiments, antenna 1460 may include multiple physical antennas.

Radio frequency circuit 1450 communicates with antenna 1460 and I/O controller 1440. In some embodiments, RF circuit 1450 includes a physical interface (PHY) corresponding to a communication protocol. For example, RF circuit 1450 may include modulators, demodulators, mixers, frequency synthesizers, low noise amplifiers, power amplifiers, and the like. In some embodiments, RF circuit 1450 may include a direction conversion receiver. In some embodiments, RF circuit 1450 may include multiple receivers. For example, in embodiments with multiple antennas 1460, each antenna may be coupled to a corresponding receiver. In operation, RF circuit 1450 receives communications signals from antenna 1460, and provides analog or digital signals to I/O controller 1440. Further, I/0 controller 1440 may provide signals to RF circuit 1450, which operates on the signals and then transmits them to antenna 1460.

Processor 1410 may be any type of processing device. For example, processor 1410 may be a microprocessor, a microcontroller, or the like. Further, processor 1410 may include any number of processing cores, or may include any number of separate processors. Processor 1410 may include on-chip RAM, which may utilize any of the clock-gating RAM architecture embodiments described herein.

Memory controller 1420 provides a communications path between processor 1410 and other devices shown in FIG. 14. In some embodiments, memory controller 1420 is part of a hub device that provides other functions as well. As shown in FIG. 14, memory controller 1420 is coupled to processor 1410, I/O controller 1440, and memory 1430. Memory controller 1420 may communicate with memory 1430 using bus 1422. Memory controller 1420 may include on-chip RAM, which may utilize any of the clock-gating RAM architecture embodiments described herein.

Memory 1430 may include multiple memory devices. Further, each of the memory devices may include the circuitry described herein. Memory 1430 may be any type of memory technology. For example, memory 1430 may be RAM, dynamic random access memory (DRAM), static random access memory (SRAM), nonvolatile memory such as FLASH memory, or any other type of memory.

Memory 1430 may represent a single memory device or a number of memory devices on one or more memory modules.

Memory controller 1430 provides data through bus 1422 to memory 1430 and receives data from memory 1430 in response to read requests. Commands and/or addresses may be provided to memory 1430 through conductors other than bus 1422 or through bus 1422. Memory controller 1430 may receive data to be stored in memory 1430 from processor 1410 or from another source. Memory controller 1420 may provide the data it receives from memory 1430 to processor 1410 or to another destination. Bus 1422 may be a bi-directional bus or unidirectional bus. Bus 1422 may include many parallel conductors. The signals may be differential or single ended. In some embodiments, bus 1422 operates using a forwarded, multi-phase clock scheme. Memory 730 may include any of the clock-gating RAM architectures described herein, and may be implemented in a single integrated circuit.

Memory controller 1420 is also coupled to I/O controller 1440, and provides a communication path between processor 1420 and I/O controller 1440. I/O controller 1440 includes circuitry for communicating with I/0 circuits such as serial ports, parallel ports, universal serial bus (USB) ports, and the like. As shown in FIG. 14, I/O controller 1440 provides a communications path to RF circuits 1450. Memory controller 1420 and I/O controller 1440 may include on-chip RAM, which may utilize any of the clock-gating RAM architectures described herein.

Figure 15:
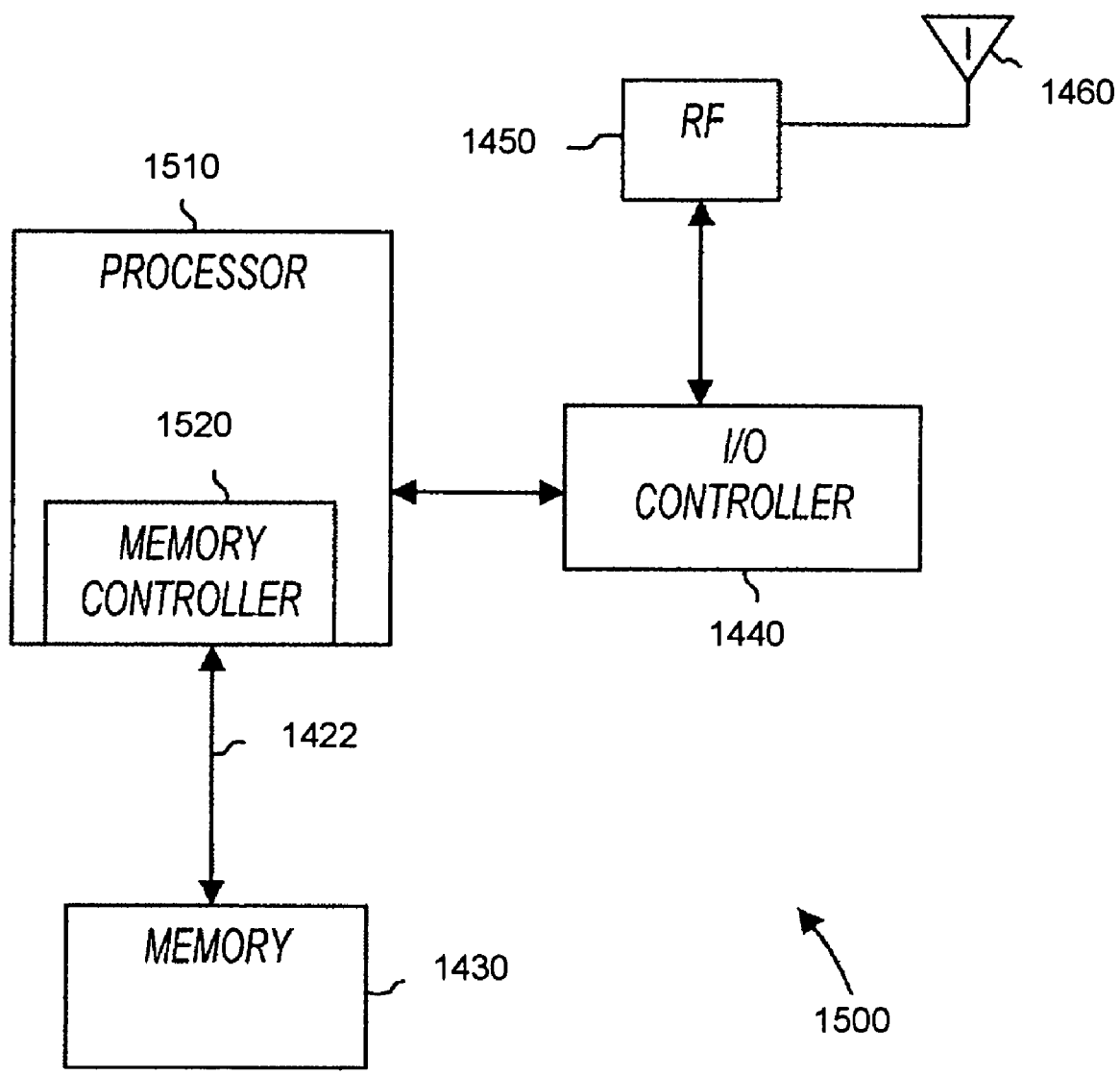
FIG. 15 illustrates another electronic system in accordance with various embodiments of the present invention.

FIG. 15 illustrates another electronic system in accordance with various embodiments of the present invention. Electronic system 1500 includes memory 1430, I/O controller 1440, RF circuits 1450, and antenna 1460, all of which are described above with reference to FIG. 14. Electronic system 1500 also includes processor 1510 and memory controller 1520. As shown in FIG. 15, memory controller 1520 is included in processor 1510. Processor 1510 may be any type of processor as described above with reference to processor 1410 (FIG. 14). Processor 1510 differs from processor 1410 in that processor 1510 includes memory controller 1520, whereas processor 710 does not include memory controller. Memory controller 1520 may include any of the clock-gating RAM architectures described herein.

The components of electronic systems 1400 and 1500 may reside on one or more integrated circuits. For example, processor 1410 may be an integrated circuit having multiple functional units, such as integrated circuit 200 as described with reference to FIG. 2. Processor 1410, as implemented as an integrated circuit, may be coupled to another integrated circuit, such as memory controller 1420 or I/O controller 740. Alternatively, as described with reference to FIG. 15, processor 1510 may include memory controller 1520 and may be implemented in one integrated circuit.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the invention.

Similarly, it should be appreciated that in the foregoing description of exemplary embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed embodiments requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
providing a clock signal to an embedded block (EBB) of a random access memory (RAM);
detecting whether the EBB is idle, wherein the EBB is idle when the EBB is not being accessed; and
gating the clock signal received by the EBB when the EBB is idle;
wherein gating the clock signal comprises: detecting a clock-gating enable signal in a first clock cycle of the clock signal; and
turning off the clock signal on a following clock cycle upon detecting the clock-gating enable signal;
wherein detecting whether the EBB is idle comprises:
detecting a de-asserted read enable signal; detecting a de-asserted write enable signal; and generating the clock-gating enable signal upon detecting both the de-asserted read enable signal and the de-asserted write enable signal.

2. The method of claim 1, wherein the EBB is idle when the EBB is not being accessed for at least one of a read access operation or a write access operation.

3. The method of claim 2, further comprising:
providing the clock signal to one or more additional EBBs of the RAM; and
un-gating the clock signal to the one or more additional EBBs of the RAM when the one or more additional EBBs are not idle while gating the clock signal received by the EBB when the EBB is idle.

4. The method of claim 1, wherein the following clock cycle is a next clock cycle after the first clock cycle upon detecting the de-asserted read enable signal.

5. The method of claim 1, wherein the following clock cycle is two clock cycles after the first clock cycle upon detecting the de-asserted write enable signal.

6. The method of claim 1, further comprising:
providing a bank having the EBB and one or more additional EBBs;
detecting whether the bank is idle, wherein the bank is idle when the bank is not being accessed; and
gating the clock signal received by the bank when the bank is idle.

7. The method of claim 6, wherein the bank is idle when the bank having the EBB and one or more additional EBBs is not being accessed for at least one of a read access operation or a write access operation.

8. The method of claim 7, further comprising:
providing the clock signal to one or more additional banks of the RAM; and
un-gating the clock signal to the one or more additional banks of the RAM when the one or more additional banks are not idle while gating the clock signal received by the bank when the bank is idle.

9. The method of claim 8, wherein detecting whether the bank is idle comprises:
detecting a de-asserted read enable signal for the bank;
detecting a de-asserted write enable signal for the bank; and
generating the clock-gating enable signal upon detecting both the de-asserted read enable signal and the de-asserted write enable signal.

10. The method of claim 9, wherein the following clock cycle is a next clock cycle after the first clock cycle upon detecting the de-asserted read enable signal for the bank.

11. The method of claim 9, wherein the following clock cycle is two clock cycles after the first clock cycle upon detecting the de-asserted write enable signal for the bank.

12. A random access memory (RAM), comprising:
a plurality of RAM banks; and
a clock gating block coupled to the plurality of RAM banks, wherein the clock gating block detects whether a RAM bank of the plurality of RAM banks is idle and gates a clock signal to be received by the RAM bank when the RAM bank is idle, wherein the RAM bank is idle when the RAM bank is not being accessed;
wherein the clock-gating block comprises a clock-gating block to gate the clock signal and enable logic block to detect whether the RAM bank is idle;
a latch to receive a clock-gating enable signal from the enable logic block, the latch to be clocked by the clock signal; and
an AND gate coupled to receive the output of the latch and the clock signal, the AND gate to produce a gated clock signal to transmit to the EBB.

13. The RAM of claim 12, wherein the RAM bank comprises one or more embedded block (EBB) coupled to the clock gating block, and wherein the clock gating block detects whether an EBB of the RAM bank is idle and gates a clock signal to be received by the EBB of the RAM bank when the EBB is idle, wherein the EBB of the RAM bank is idle when the EBB is not being accessed for at least one of a read access operation or a write access operation.

14. The RAM of claim 12, wherein the RAM is a multi-ported RAM.

15. The RAM of claim 14, wherein the multi-ported RAM is a dual-ported RAM.

16. The RAM of claim 12, wherein the RAM is a single ported RAM.

17. An apparatus, comprising:
a random access memory (RAM) having one or more embedded blocks (EBBs);
means for detecting whether an embedded block (EBB) of the one or more EBBs is idle, wherein the EBB is idle when the EBB is not being accessed; and
means for gating a clock signal received by the one or more embedded blocks when the EBB is idle;
means for reducing power in the RAM;
wherein the one or more EBBs are idle when the one or more EBBs are not being accessed for at least one of a read access operation or a write access operation.

18. A system comprising:
a first integrated circuit; and
a second integrated circuit comprising a random access memory (RAM), the RAM comprising:
a plurality of RAM banks; and a clock gating block coupled to the plurality of RAM banks, wherein the clock gating block detects whether a RAM bank of the plurality of RAM banks is idle and gates a clock signal to be received by the RAM bank of the plurality of RAM banks when the RAM bank is idle, wherein the RAM bank is idle when the RAM bank is not being accessed;
wherein the RAM bank comprises one or more embedded block (EBB) coupled to the clock gating block, and wherein the clock gating block detects whether an EBB of the RAM bank is idle and gates a clock signal to be received by the EBB of the RAM bank when the EBB is idle.

19. The system of claim 18, wherein the first integrated circuit is a memory controller.

20. The system of claim 18, wherein the first integrated circuit is a processor.

21. The system of claim 18, wherein the second integrated circuit is a processor and the first integrated circuit is a memory controller.

22. A random access memory (RAM), comprising:
a plurality of RAM banks; and a clock gating block coupled to the plurality of RAM banks, wherein the clock gating block detects whether a RAM bank of the plurality of RAM banks is idle and gates a clock signal to be received by the RAM bank when the RAM bank is idle, wherein the RAM bank is idle when the RAM bank is not being accessed;
wherein the clock-gating block comprises a clock-gating block to gate the clock signal and enable logic block to detect whether the RAM bank is idle;
wherein the enable logic block comprises a first OR gate to receive a read enable signal and a write enable signal, the first OR gate to provide a clock-gating enable signal to the clock-gating block.

23. A random access memory (RAM), comprising:
a plurality of RAM banks; and a clock gating block coupled to the plurality of RAM banks, wherein the clock gating block detects whether a RAM bank of the plurality of RAM banks is idle and gates a clock signal to be received by the RAM bank when the RAM bank is idle, wherein the RAM bank is idle when the RAM bank is not being accessed;
wherein the clock-gating block comprises a clock-gating block to gate the clock signal and enable logic block to detect whether the RAM bank is idle;
wherein the enable logic block comprises:
a first OR gate to receive a write enable signal and a delayed write enable signal; and
a second OR gate to receive an output of the first OR gate and a read enable signal, the second OR gate to provide a clock-gating enable signal to the clock-gating block.

24. A random access memory (RAM), comprising:
a plurality of RAM banks; and a clock gating block coupled to the plurality of RAM banks, wherein the clock gating block detects whether a RAM bank of the plurality of RAM banks is idle and gates a clock signal to be received by the RAM bank when the RAM bank is idle, wherein the RAM bank is idle when the RAM bank is not being accessed;
wherein the clock-gating block comprises a clock-gating block to gate the clock signal and enable logic block to detect whether the RAM bank is idle;
wherein the enable logic block comprises:
a first OR gate to receive a write enable signal and a delayed write enable signal;
a second OR gate to receive a bypass enable signal and a read enable signal; and
a third OR gate to receive an output of the first OR gate and an output of the second OR gate, the third OR gate to provide a clock-gating enable signal to the clock-gating block.

* * * * *